United States Patent
Kokami et al.

(10) Patent No.: US 9,707,484 B2
(45) Date of Patent: Jul. 18, 2017

(54) GAME CONTROL DEVICE, CONTROL METHOD FOR GAME CONTROL DEVICE, PROGRAM, AND INFORMATION STORAGE MEDIUM

(71) Applicant: KONAMI DIGITAL ENTERTAINMENT CO., LTD., Tokyo (JP)

(72) Inventors: Kensuke Kokami, Yokohama (JP); Kenichi Miyaji, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 337 days.

(21) Appl. No.: 14/380,376

(22) PCT Filed: Feb. 22, 2013

(86) PCT No.: PCT/JP2013/054592
§ 371 (c)(1),
(2) Date: Aug. 22, 2014

(87) PCT Pub. No.: WO2013/125701
PCT Pub. Date: Aug. 29, 2013

(65) Prior Publication Data
US 2015/0024850 A1 Jan. 22, 2015

(30) Foreign Application Priority Data
Feb. 23, 2012 (JP) ................................. 2012-036979

(51) Int. Cl.
*A63F 9/24* (2006.01)
*A63F 13/48* (2014.01)
(Continued)

(52) U.S. Cl.
CPC .............. *A63F 13/48* (2014.09); *A63F 13/31* (2014.09); *A63F 13/58* (2014.09); *A63F 13/822* (2014.09);
(Continued)

(58) Field of Classification Search
None
See application file for complete search history.

(56) References Cited

U.S. PATENT DOCUMENTS

| 6,755,743 B1 | 6/2004 | Yamashita et al. |
| 2002/0169013 A1 * | 11/2002 | Serizawa ............... A63F 13/005 463/6 |

(Continued)

FOREIGN PATENT DOCUMENTS

| JP | 2004-181270 A | 7/2004 |
| JP | 2004-230071 A | 8/2004 |

(Continued)

OTHER PUBLICATIONS

"Appli Style" vol. 2, pp. 26 to 27, issued on Mar. 23, 2011, published by East Press Co., Ltd.. Pertinent parts discussed in "Background Art" of the specification.

(Continued)

*Primary Examiner* — Paul A D'Agostino
(74) *Attorney, Agent, or Firm* — Hubbs, Enatsky & Inoue PLLC

(57) ABSTRACT

A game control device capable of giving at least one of a plurality of game data sets that are members of an opponent game data group to a user. A match request receiving unit receives a match request sent from a user terminal. An opponent game data group determination unit determines a plurality of game data sets as members of the opponent game data group. In a case where the match request is received, a match executing unit executes a match based on one of the (Continued)

game data group and the game data of the user, and the opponent game data group. In a case where the match is executed, a game data giving unit gives at least one of the plurality of game data sets that are members of the opponent game data group to the user.

18 Claims, 25 Drawing Sheets

(51) Int. Cl.
 *A63F 13/31* (2014.01)
 *A63F 13/58* (2014.01)
 *A63F 13/822* (2014.01)
 *A63F 13/828* (2014.01)
(52) U.S. Cl.
 CPC ..... *A63F 13/828* (2014.09); *A63F 2300/5593* (2013.01); *A63F 2300/636* (2013.01)

(56) References Cited

U.S. PATENT DOCUMENTS

| | | | | |
|---|---|---|---|---|
| 2004/0157654 A1* | 8/2004 | Kataoka | ............... | A63F 13/12 463/4 |
| 2007/0082723 A1* | 4/2007 | Ohashi | ............... | A63F 13/12 463/16 |
| 2008/0090658 A1* | 4/2008 | Kaji | ............... | A63F 13/08 463/31 |
| 2008/0153562 A1* | 6/2008 | Ohara | ............... | A63F 1/04 463/16 |

FOREIGN PATENT DOCUMENTS

| | | |
|---|---|---|
| JP | 2011-182863 A | 9/2011 |
| KR | 10-2005-0077501 A | 8/2005 |

OTHER PUBLICATIONS

"Famitsu mobage", Dec. 15, 2011 (Dec. 15, 2011), vol. 3, Jan. 12, 2012 extra number, pp. 70 to 71, issued on Dec. 15, 2011, published by Enterbrain, Inc.. See English translation of ISR.
"Final Fantasy VIII Ultimania", First Edition, pp. 154 to 164, issued on Mar. 31, 1999, published by Digicube Co., Ltd.. See partial translation of Office Action for corresponding Japanese Patent Application No. 2013-153953 dated Jul. 29, 2014.
"Ultimate Guide of Dynasty Warriors DS: Fighter's Battle", First Edition, pp. 004, 005, 008, 016-018, 044 and 084, issued on Apr. 28, 2007, published by Koei Co., Ltd.. See partial translation of Office Action for corresponding Japanese Patent Application No. 2013-153953 dated Jul. 29, 2014.
The partial translation of Office Action for corresponding Japanese Patent Application No. 2013-153953 dated Jul. 29, 2014.
International Search Report for PCT/JP2013/054592 dated Apr. 2, 2013.
The partial translation of Office Action for corresponding Japanese Patent Application No. 2014-240568 dated on Feb. 3, 2015.

* cited by examiner

FIG.3

| USER ID | U00001 |
|---|---|
| USER NAME | A |
| IMAGE | U00001.jpg |
| TEAM NAME | ○○○ |
| LEVEL | 10 |
| COOPERATION DEGREE | 1 |
| EXPERIENCE VALUE | 50 |
| LEAGUE | Lv1 |
| INTRA-LEAGUE RANK | 1000 |
| OVERALL RANK | 75000 |
| ACTION POINT | 30/30 |
| OPERATION POINT | 85/85 |
| GROWTH POINT | 10000 |
| LOT POINT | 5000 |
| NUMBER OF PLAYERS | 50 |

| AVAILABLE PLAYER | PLAYER ID | PLAYER PARAMETER |
|---|---|---|
| | P00100 | ----- |
| | P00250 | ----- |
| | ..... | ..... |

| AVAILABLE ITEM | ITEM ID | ITEM PARAMETER |
|---|---|---|
| | I00010 | ----- |
| | I00150 | ----- |
| | ..... | ..... |

| NUMBER OF FRIENDS | 10 |
|---|---|
| FRIEND LIST | U00015, U00023,··· |
| BLOW STRENGTH | 5 |
| STRENGTH LEVEL OF COMPUTER TEAM | 0 |
| LAST ACCESS TIME AND DATE | 2012/02/21 17:05:10 |

| PLAYER PARAMETER DATA | |
|---|---|
| LEVEL | 6 |
| COST | 6 |
| OFFENSE | 200 |
| DEFENSE | 250 |
| TECHNIQUE | 300 |
| COOPERATION DEGREE | 1 |
| EXPERIENCE VALUE | 30 |

FIG.8

| MANNER OF BLOWING WHISTLE | INCREASE/DECREASE OF BLOW STRENGTH |
|---|---|
| BLOW STRONGLY | +2 ~ +3 |
| BLOW CHEERFULLY | +1 |
| BLOW GENTLY | −2 ~ −3 |

FIG.9

| BLOW STRENGTH | PROBABILITY INFORMATION FOR DETERMINING COMPUTER TEAM MEMBER | | | | |
|---|---|---|---|---|---|
| | SS | S | G | R | N |
| 0 | / | / | / | / | / |
| 1 | 0% | 0% | 0% | 0% | 100% |
| 2 | 0% | 0% | 0% | 5% | 95% |
| 3 | 0% | 0% | 0% | 15% | 85% |
| 4 | 1% | 1% | 5% | 20% | 73% |
| 5 | 1% | 2% | 10% | 25% | 62% |
| 6 | 1% | 3% | 15% | 30% | 51% |
| 7 | 5% | 10% | 25% | 60% | 0% |
| 8 | 10% | 20% | 40% | 30% | 0% |
| 9 | 5% | 10% | 25% | 60% | 0% |
| 10 | / | / | / | / | / |

FIG.11

| BLOW STRENGTH | MESSAGE |
|---|---|
| 0 | WHISTLE DID NOT SOUND···<br>BLOW MORE STRONGLY NEXT |
| 1 | WHISTLE SOUNDS FAINTLY<br>BLEW TOO WEAK |
| 2 | ---------- |
| 3 | ---------- |
| 4 | ---------- |
| 5 | WHISTLE SOUNDS NORMALLY !<br>BETTER BLOW MORE STRONGLY ! |
| 6 | ---------- |
| 7 | ---------- |
| 8 | WHISTLE SOUNDS SUPER |
| 9 | TOO STRONG ! !<br>BETTER BLOW MORE GENTLY |
| 10 | WHISTLE IS FLOWN AWAY AS BLOWN TOO STRONGLY!!<br>BLOW GENTLY NEXT··· |

| COMPUTER TEAM STRENGTH LEVEL | COMPUTER TEAM COOPERATION DEGREE |
|---|---|
| 0 | 0 |
| 1 | 2 |
| 2 | 4 |
| ... | ... |
| 10 | 20 |
| 11 | 25 |
| ... | ... |
| 20 | 70 |
| 21 OR LARGER | 99 |

| TYPE OF PLAYER CARD GIVEN TO USER | INCREASE AMOUNT OF COMPUTER TEAM STRENGTH LEVEL |
|---|---|
| NORMAL | 0 |
| REGULAR | 0 |
| GREAT | 1 |
| STAR | 3 |
| SUPERSTAR | 10 |

YOU'VE GOT A RANDOM WHISTLE!!

112

BLOW — 114

110

YOU'VE GOT A GOLDEN WHISTLE!!

122

BLOW — 124

120

| PROBABILITY INFORMATION FOR DETERMINING COMPUTER TEAM MEMBER | | | | |
|---|---|---|---|---|
| SS | S | G | R | N |
| 20% | 30% | 50% | 0% | 0% |

FIG.33

| TRANSFEREE USER | TRANSFEROR USER | ITEM ID | ITEM PARAMETER |
|---|---|---|---|
| U00010 | U00001 | I00999 (GOLDEN WHISTLE) | NUMBER OF REMAINS: 4 |

FIG.34

| NUMBER OF REMAINS | PROBABILITY INFORMATION FOR DETERMINING COMPUTER TEAM MEMBER | | | | |
|---|---|---|---|---|---|
| | SS | S | G | R | N |
| 5 | 20% | 30% | 50% | 0% | 0% |
| 4 | 18% | 28% | 54% | 0% | 0% |
| 3 | 16% | 26% | 58% | 0% | 0% |
| 2 | 14% | 24% | 62% | 0% | 0% |
| 1 | 12% | 22% | 66% | 0% | 0% |

GAME CONTROL DEVICE, CONTROL METHOD FOR GAME CONTROL DEVICE, PROGRAM, AND INFORMATION STORAGE MEDIUM

CROSS REFERENCE TO RELATED APPLICATIONS

This application is a National Stage of International Application No. PCT/JP2013/054592 filed Feb. 22, 2013, claiming priority based on Japanese Patent Application No. 2012-036979 filed on Feb. 23, 2012. The contents of each of the above documents are incorporated herein by reference in their entirety.

TECHNICAL FIELD

The present invention relates to a game control device, a control method for a game control device, a program, and an information storage medium.

BACKGROUND ART

There is known a game system for executing a match based on a game data group or game data of a user and an opponent game data group. For example, there is known a game system for executing a match based on a plurality of game card data sets of a user and a plurality of game card data sets of an opponent.

CITATION LIST

Non-Patent Literature

Non-Patent Literature 1: Appli STYLE Vol. 2, East Press Co., Ltd., pp. 26 and 27

SUMMARY

Technical Problem

A conventional game system does not have a function of giving at least one of a plurality of game data sets that are members of an opponent game data group to a user in a case where a match is executed. However, if such a function is implemented, it will be possible to enhance the level of amusement of a match executed in a game system such as is described above.

The present invention has been conceived in view of the above described problem, and aims to provide a game control device, a control method for a game control device, a program, and an information storage medium capable of giving at least one of a plurality of game data sets that are members of an opponent game data group to a user.

Solution to Problem

In order to achieve the above described object, a game control device according to the present invention is a game control device (10) that is capable of communication with a user terminal (20) and that executes a match based on one of a game data group and game data of a user, and an opponent game data group. The game control device (10) includes match request receiving means (144) for receiving a match request sent from the user terminal (20); opponent game data group determination means (146) for determining a plurality of game data sets as members of the opponent game data group; match executing means (148) for executing the match based on the opponent game data group and one of the game data group and the game data of the user in a case where the match request is received; and game data giving means (150) for giving at least one of the plurality of game data sets that are members of the opponent game data group to the user in a case where the match is executed.

A control method for a game control device according to the present invention is a control method for a game control device that is capable of communication with a user terminal and that executes a match based on one of a game data group and game data of a user, and an opponent game data group. The control method includes a match request receiving step of receiving a match request sent from the user terminal; an opponent game data group determination step of determining a plurality of game data sets as members of the opponent game data group; a match executing step of executing the match based on the opponent game data group and one of the game data group and the game data of the user in a case where the match request is received; and a game data giving step of giving at least one of the plurality of game data sets that are members of the opponent game data group to the user in a case where the match is executed.

A program according to the present invention is a program for causing a computer to function as a game control device that is capable of communication with a user terminal and that executes a match based on one of a game data group and game data of a user, and an opponent game data group. The program causes the computer to function as match request receiving means (144) for receiving a match request sent from the user terminal; opponent game data group determination means (146) for determining a plurality of game data sets as members of the opponent game data group; match executing unit (148) for executing the match based on the opponent game data group and one of the game data group and the game data of the user in a case where the match request is received; and game data giving means (150) for giving at least one of the plurality of game data sets that are members of the opponent game data group to the user in a case where the match is executed.

An information storage medium according to the present invention is a computer readable information storage medium storing the above described program.

According to one aspect of the present invention, the match request receiving means (144) may include means for receiving a selection of at least one of a plurality of options relevant to the match request, the game control device (10) may include parameter update means (152) for updating a parameter based on the option selected by the user, the parameter being stored in parameter storage means (140) for storing the parameter so as to be correlated to the user, and the opponent game data group determination means (146) may include means for determining the plurality of game data sets to be the members of the opponent game data group based on the parameter.

According to one aspect of the present invention, the game control device may further include means (148) for determining whether or not the parameter is at a predetermined value; and means (148) for restricting execution of the match in a case where the parameter is at the predetermined value.

According to one aspect of the present invention, the game control device (10) may further include strength information update means (154) for updating strength information such that the strength of the opponent game data group is increased in at least one of a case in which the match is executed, a case in which the user wins the match, a case in which the game data is given to the user, and a case in which the game data given to the user is predetermined game data, the strength information being information on strength of the opponent game data group and being stored in strength information storage means (140) for storing the strength information so as to be correlated to the user, and the opponent game data group determination means (146) may include means for setting the opponent game data group based on the strength information.

According to one aspect of the present invention, the strength information update means (154) may update the strength information such that the strength of the opponent game data group is increased in a case where a predetermined type of game data is given to the user, and the strength information update means (154) may determine an amount by which to increase the strength of the opponent game data group, based on a type of the game data given to the user.

According to one aspect of the present invention, the game control device may further include means (154) for determining whether or not it has become a predetermined time or a predetermined time and date; and means (154) for updating the strength information such that the strength of the opponent game data group is decreased in a case where it has become the predetermined time or the predetermined time and date.

According to one aspect of the present invention, the game control device may further include right giving means (142) for giving a right of requesting the match to the user, the match request receiving means (144) may receive the match request in a case where the user holds the right, the game control device (10) may include right transfer means (156) for executing transfer processing for transferring the right held by the user to another user, and the opponent game data group determination means (146) may include means for determining the plurality of game data sets to be the members of the opponent game data group based on a number of times the right has been transferred, the number of times the right has been transferred being stored in transfer number of times storage means (140) for storing the number of times the right has been transferred.

According to one aspect of the present invention, the right transfer means (156) may execute the transfer processing for transferring the right to another user having a predetermined relationship with the user holding the right based on relationship information, the relationship information being information on a relationship between users and being stored in relationship information storage means for storing the relationship information.

According to one aspect of the present invention, the game control device may further include access status determination means (158) for determining whether or not a status of access from another user having a predetermined relationship with the user to the game control device is of a predetermined status based on relationship information, the relationship information being information on a relationship between users and being stored in relationship information storage means (140) for storing the relationship information, and the opponent game data group determination means (146) may include means for determining the plurality of game data sets to be the members of the opponent game data group based on a result of determination by the access status determination means.

According to one aspect of the present invention, the opponent game data group determination unit (146) may select the plurality of game data sets to be the members of the opponent game data group from among a plurality of game data sets stored in game data storage means for storing the plurality of game data sets.

According to one aspect of the present invention, the game data may be one of game character data on a game character, game card data on a game card, and game item data on a game item.

Note that although the reference numerals shown in the drawings are included in parentheses in the above to help understanding of the present invention, this does not mean that the present invention is thereby limited to the aspect shown in the drawings.

Advantageous Effects of Invention

According to the present invention, it is possible to give at least one of a plurality of game data sets that are members of an opponent game data group to a user.

BRIEF DESCRIPTION OF DRAWINGS

FIG. 3 shows one example of a user database;
FIG. 8 shows one example of a correlation between a manner of whistling and increase/decrease of blow strength;
FIG. 9 shows one example of a correlation between blow strength and information on computer team member selection control;
FIG. 11 shows one example of a correlation between blow strength and a message.

FIG. 33 shows one example of transfer data; and

FIG. 34 shows one example of a correlation between the number of golden whistles remaining and probability information in determining members of the computer team.

DESCRIPTION OF EMBODIMENTS

In the following, one example of an embodiment of the present invention will be described in detail based on the drawings.

Figure 1:
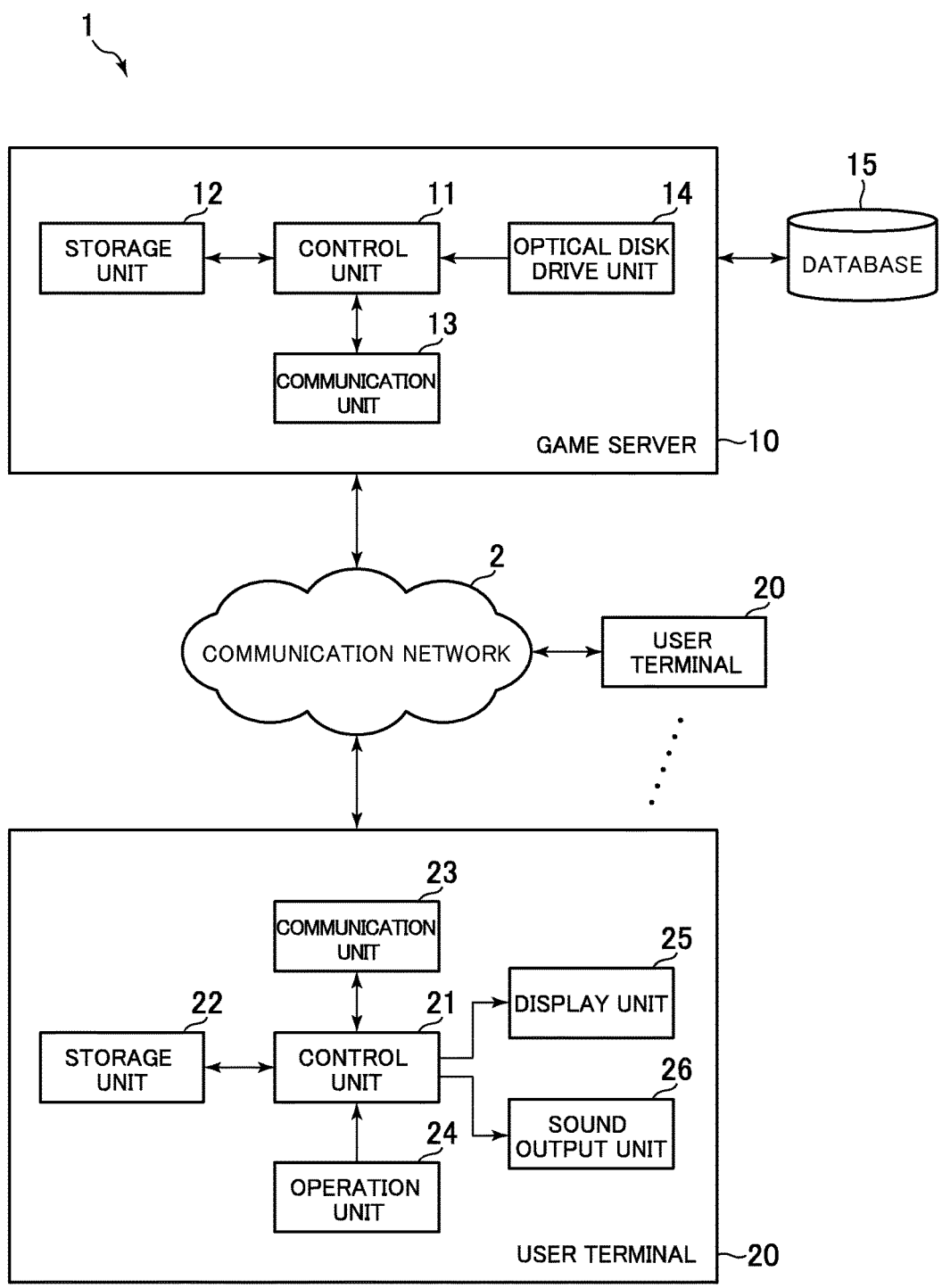
FIG. 1 shows an overall structure of a game system.

FIG. 1 shows an overall structure of a game system according to the embodiment of the present invention. As shown in FIG. 1, a game system 1 according to the embodiment includes a game server 10 (a game control device) and a plurality of user terminals 20. The game server 10 and the plurality of user terminals 20 are connected to a communication network 2 so that data communication is possible between the game server 10 and each of the user terminals 20.

The game server 10 is implemented using a server computer, for example. As shown in FIG. 1, the game server 10 includes a control unit 11, a storage unit 12, a communication unit 13, and an optical disk drive unit 14. The control unit 11 includes at least one CPU, for example, and executes information processing according to an operating system or other program. The storage unit 12 includes a main memory unit (for example, a RAM) and an auxiliary storage unit (for example, a hard disk drive or a solid state drive). The communication unit 13 is used for data exchange with other devices (for example, the user terminal 20) via the communication network 2. The optical disk drive unit 14 reads a program and data stored in an optical disk (an information storage medium).

The program and data are supplied to the game server 10 via the optical disk. That is, the program and data recorded in the optical disk are read by the optical disk drive unit 14, and stored in the storage unit 12. A structural element (for example, a memory card slot) for reading a program and data stored in an information storage medium (for example, a memory card) other than the optical disk may be provided to the game server 10, so that the program and data may be supplied to the game server 10 via the information storage medium other than the optical disk. Alternatively, the program and data may be supplied from a remote place to the game server 10 via the communication network 2.

The game server 10 can access a database 15. The database 15 may be created in the game server 10 or in a server computer other than the game server 10.

The user terminal 20 is an information processing device for use by a user to play a game. The user terminal 20 is implemented using, for example, a portable phone (including a smart phone), a portable information terminal (including a tablet type computer), a personal computer, a portable game device, or a consumer game device (an installation type game device). The description below is based on an assumption that the user terminal 20 is a portable phone (a smart phone).

As shown in FIG. 1, the user terminal 20 includes a control unit 21, a storage unit 22, a communication unit 23, an operation unit 24, a display unit 25, and a sound output unit 26. The control unit 21, the storage unit 22, and the communication unit 23 are similar to the control unit 11, the storage unit 12, and the communication unit 13 of the game server 10.

The operation unit 24 is used by a user to perform various operations (various instructions). For example, a pointing device for use by a user to designate a position in a screen displayed on the display unit 25 is provided as the operation unit 24. For example, a touch panel is provided on the user terminal 20 so as to overlap the display unit 25. Note that, for example, a mouse, a stick, a touch pad, a button (a key), a lever (a stick), or the like, may be provided on the user terminal 20 instead of the touch panel. The display unit 25 is, for example, a liquid crystal display, an organic EL display, or the like, and displays various screens. The sound output unit 26 is, for example, a speaker, a headphone, or the like, and outputs sound data.

A program and data are supplied from a remote place to the user terminal 20 via the communication network 2. A structural element for reading a program and data stored in an information storage medium, such as a memory card, an optical disk, or the like, may be provided in the user terminal 20. In this case, the program and data stored in the memory card or the optical disk may be read, and stored in the storage unit 22.

For example, an HTTP daemon is activated in the game server 10. A browser is activated in the user terminal 20, and a processing request (an HTTP request) is sent from the user terminal 20 via the browser to the game server 10. Further, a processing result (an HTTP response) in response to the above described processing request is sent from the game server 10 to the user terminal 20. For example, page data written in a web page descriptive language is sent to the user terminal 20. Then, a screen based on the processing result is displayed on the display unit 25 of the user terminal 20 based on the page data.

In the game system 1, a match is executed based on a game data group or game data of a user and an opponent game data group. In the following, a game in which a user collects player cards corresponding to actual soccer players and competes with a computer or another user will be described as an example of a game that is executed in the game system 1.

Initially, data stored in the database 15 will be described. For example, the database 15 includes a player card database and a user database.

Figure 2:
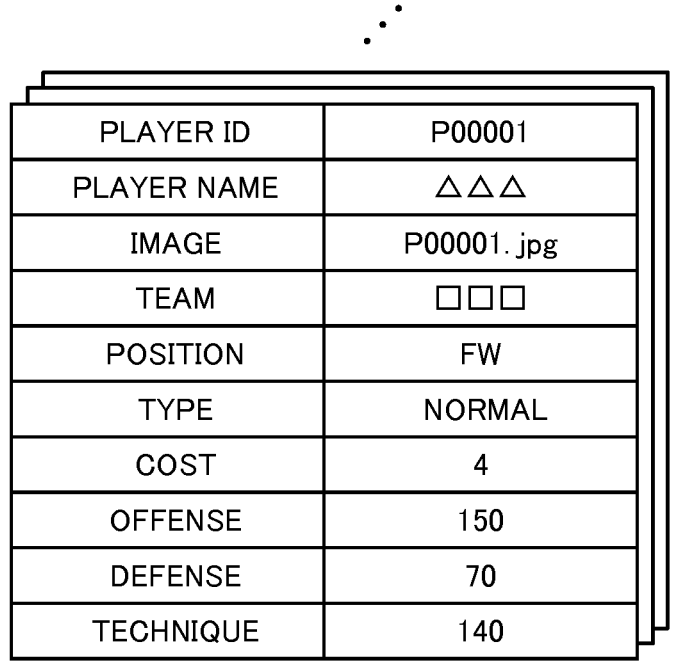
FIG. 2 shows one example of a player database.

In the player card database, data on all player cards prepared in advance in the game system 1 are stored. FIG. 2 shows one example of the player card database. As shown in FIG. 2, each player card data includes "player ID", "player name", "image", "team", "position", "type", "cost", "offense", "defense", and "technique" fields.

The "player ID" field indicates identification information for uniquely identifying a player card. The "player name" field indicates the name of a soccer player correlated to the player card. The "image" field shows an image of the soccer player correlated to the player card.

The "team" field indicates a team to which the actual soccer player correlated to the player card belongs. The "position" field indicates a position which the soccer player correlated to the player card is good at playing. For example, any of FW (forward), MF (midfielder), DF (defender), and GK (goal keeper) is registered in the "position" field.

The "type" field indicates the level of ability of the player card. As a player card of a soccer player with high ability is rare, the "type" field indicates the level of rarity of the player card. In the game system 1, five types, namely, "superstar", "star", "great", "regular", and "normal", are prepared, and any of these types is registered in the "type" field. Specifically, "superstar" is a type of the highest ability (rarity); "star" the second highest ability (rarity); "great" the third highest ability (rarity); "regular" the fourth highest ability (rarity); "normal" the lowest ability (rarity).

The "cost" field indicates a cost necessary to use the player card in the match, that is, a cost necessary to use the player card as a member taking part in the match. The "cost" will be described later.

The "offense" field indicates a basic value (an initial value) of an attack parameter of the player. The "defense" field indicates a basic value of a defense parameter of the player. The "technique" field indicates a basic value of a technique parameter of the player.

In the user database, data on all users of the game system 1 are stored. FIG. 3 shows one example of the user database. As shown in FIG. 3, each user data includes "user ID", "user name", and "image" fields. The "user ID" field indicates identification information for uniquely identifying a user. The "user name" field indicates the name of the user. The "image" field shows an image of the user.

Each user data includes "team name", "level", "cooperation degree", and "experience value" fields. The "team name" field indicates the name of a soccer team held by the user. The "level" field indicates the level of the soccer team of the user. The "cooperation degree" field indicates a trained level of a cooperation play between players belonging to the soccer team. Specifically, a higher level and a higher cooperation degree mean that the soccer team is stronger. The "experience value" field indicates an experience value obtained by the soccer team. When the value in the "experience value" field becomes a predetermined value, the value in the "level" field is increased.

Each user data further includes "league", "intra-league rank", and "overall rank" fields. The "league" field indicates a league to which the soccer team of the user belongs. In the game system 1, a plurality of leagues at different levels are prepared, and the soccer team of the user belongs to any of the leagues.

The "intra-league rank" field indicates the rank of the soccer team of the user in the league. The "overall rank" field indicates the rank of the soccer team of the user among all soccer teams. In the game system 1, a match is automatically executed between soccer teams belonging to the same league, and the intra-league rank is changed based on the result of the match. When the intra-league rank of the soccer team of the user becomes higher, the soccer team of the user is promoted to the immediately upper league in the hierarchy. Meanwhile, when the intra-league rank of the soccer team of the user is lowered, the soccer team of the user is demoted to the immediately lower league in the hierarchy.

Each user data further includes "action point", "operation point", "growth point", and "lot point" fields.

The "action point" field indicates the current value and the maximum value of an action point. In the game system 1, a user executes a search for a player to thereby obtain a player card. The action point is consumed by executing a player search, and accrued for every elapse of a predetermined period of time.

The "operation point" field indicates the current value and the maximum value of an operation point. Specifically, the operation point is consumed by executing a match against a soccer team of another user, and accrued in predetermined amounts for every elapse of a predetermined period. In executing a match against a soccer team of another user, the total costs of the player cards used in the match is consumed. Therefore, player cards to be used in the match are determined such that the total costs of the player cards used in the match do not exceed the operation point.

The "growth point" field indicates a growth point. In the game system 1, the user combines a player card and another player card to thereby grow (strengthen) the player card. The growth point is consumed by growing the player card.

The "lot point" field indicates a lot point. In the game system 1, the user obtains a player card by drawing a lot that emulates a capsuled toy. The lot point is consumed by drawing a lot.

Note that an item for restoring the action point and the operation point is prepared, so that the user can have the action point and the operation point restored to the maximum value by using the item.

Each user data further includes "number of players" and "available player" fields. The "number of players" field indicates the number of player cards held by the user. The "available player" field indicates a list of player cards held by the user. Specifically, the player ID and player parameter data of a player card held by the user are registered in the "available player" field.

Figures 4, 5:
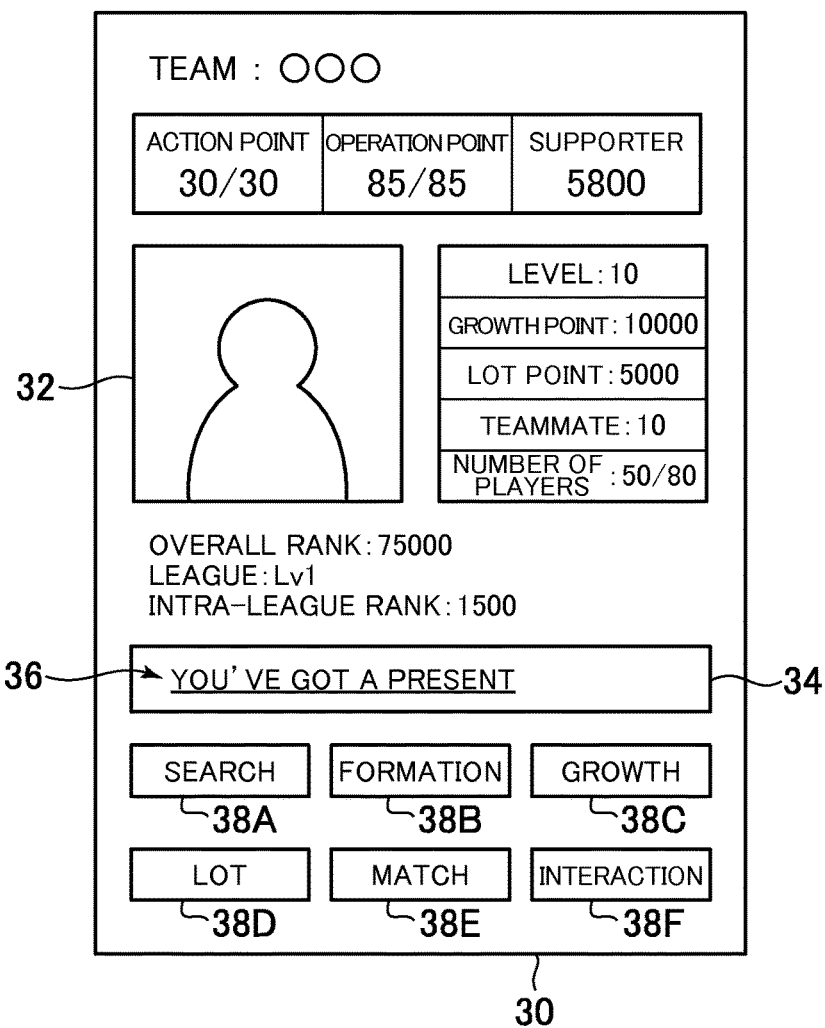
FIG. 4 shows one example of player parameter data.
FIG. 5 shows one example of a main screen.

FIG. 4 shows one example of a player parameter. As shown in FIG. 4, the player parameter data includes "level", "cost", "offense", "defense", "technique", "cooperation degree", and "experience value" fields.

The "level", "cost", "offense", "defense", and "technique" fields are similar to those in the player card database (see FIG. 2). However, the respective values in the "level", "offense", "defense", and "technique" fields are increased by growing the player card, as will be described later. The "cooperation degree" field indicates a trained level of a cooperation play. The "experience value" field indicates an experience value obtained by the player. The value in the "experience value" is increased by growing the player card. When the value in the "experience value" field becomes a predetermined value, the value in the "level" field is increased. In this case, the respective values in the "offense", "defense", and "technique" fields are increased as well.

Each user data further includes an "available item" field. The "available item" field shows a list of items held by the user. Specifically, the item ID and item parameter data of an item held by the user are registered in the "available item" field.

Each user data further includes a "number of friends", "friend list", "blow strength", "strength level of computer team", and "last access time and date" fields. The "number of friends" field indicates the number of other users who hold a friendship (peer relationship) with the user. The "friend list" field shows a list of other users who hold a friendship (peer relationship) with the user.

The "blow strength" field indicates a blow strength of the user, details of which will be described later. The "strength level of computer team" field indicates the strength of a soccer team of a computer that is set when executing a match between the soccer team of the user and the soccer team of the computer, details of which will be described later. The "last access time and date" field indicates a time and date at which the user last accessed the game server 10.

In the following, one example of a game screen displayed on the display unit 25 of the user terminal 20 will be described. FIG. 5 shows one example of a main screen that is displayed on the display unit 25 upon access to the game system 1. As shown in FIG. 5, various information items concerning the soccer team of the user are shown in the main screen 30.

The main screen 30 includes a representative player image 32. An image of a representative player card among the player cards held by the user is shown as the representative player image 32. The main screen 30 further includes a notice space 34. A notice message 36 addressed to the user is shown in the notice space 34. The main screen 30 still further includes a search button 38A, a formation button 38B, a growth button 38C, a lot button 38D, a match button 38E, and an interaction button 38F.

The formation button 38B is a button for setting a formation of the soccer team of the user. That is, when the formation button 38B is selected, a screen for setting a formation is displayed on the display unit 25. In the screen, the user selects the type of formation, such as, for example, "4-4-2", or the like, and a player card to be assigned to each position. That is, the user selects eleven player cards to be used in a match against an opponent (a computer or another user).

The growth button 38C is a button for growing (strengthening) a player card held by the user. That is, when the growth button 38C is selected, a screen for growing (improving) a player card is displayed on the display unit 25. As described above, in the game system 1, it is possible to grow (improve) a player card by combining the player card and another player card. In the above mentioned screen, the user selects a player card which the user wishes to grow and another player card to be consumed to grow the player card, to thereby grow the player card. As described above, growing the player card is executed in exchange for a predetermined amount of growth points.

The lot button 38D is a button for obtaining a player card by drawing a lot for a player card. That is, when the lot button 38D is selected, a screen that emulates, for example, a capsulated toy is displayed on the display unit 25. In the screen, a lot for a player card is drawn. As described above, the lot for a player card is drawn in exchange for a predetermined amount of lot points.

The match button 38E is a button for executing a match with a soccer team of another user that is an opponent. That is, when the match button 38E is selected, a screen for playing a match against a soccer team of another user is displayed on the display unit 25. As described above, the match is executed in exchange for the amount of operation points corresponding to the total costs of the player cards used in the match. The user can obtain, for example, an item or a growth point by winning the match against the soccer team of another user.

The interaction button 38F is a button for interacting with another user. That is, when the interaction button 38F is selected, a screen for sending a message to another user or for presenting a player card or an item to another user is displayed on the display unit 25.

Figure 6:
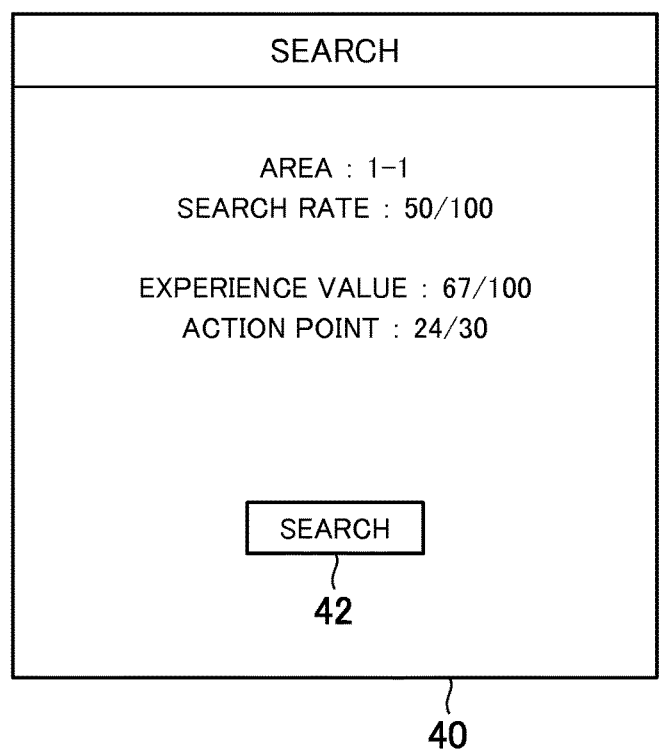
FIG. 6 shows one example of a search screen.

The search button 38A is a button for searching for a player (a player card). That is, when the search button 38A is selected, a search screen for searching for a player is displayed on the display unit 25. FIG. 6 shows one example of the search screen. As shown in FIG. 6, an area under search, a search rate for the area, an experience value of the soccer team of the user, and the current value and the maximum value of the action point are shown in the search screen 40.

The search screen 40 includes a search button 42. When the search button 42 is selected, a search for a player is executed. When the search for a player is successfully completed, a player card is given to the user, and a screen showing the player card given to the user is displayed on the display unit 25. Whether or not the search for a player is successfully completed and which player card is given to the user are determined at random based on a predetermined probability. The search rate is increased for every search for a player. When the search rate becomes a predetermined value (for example, 100), the search for the area is completed, and the user can go on to the next area.

In the game system 1 according to this embodiment, a whistle, or an item for executing a match between the soccer team of the user (hereinafter referred to as a "user team") and the soccer team of the computer (hereinafter referred to as a "computer team"), may be given to the user when the search for a player is executed. When the whistle is given to the user, a whistle obtaining screen is displayed on the display unit 25.

Figure 7:
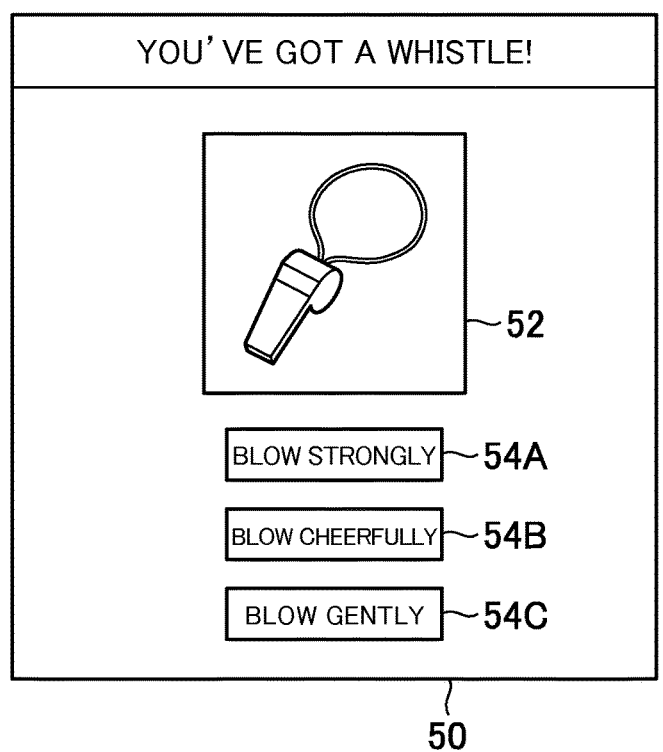
FIG. 7 shows one example of a whistle obtaining screen.

FIG. 7 shows one example of the whistle obtaining screen. As shown in FIG. 7, the whistle obtaining screen 50 includes an item image 52 showing the obtained whistle. The whistle obtaining screen 50 further includes a button for selecting a manner of blowing the whistle, or whistling. Specifically, a blow strongly button 54A, a blow cheerfully button 54B, and a blow gently button 54C are included in the whistle obtaining screen 50.

In the game system 1, player cards to be members of the computer team are selected from the player card database. Specifically, different player cards are selected to be the members of the computer team based on the manner of whistling.

This structure will be described below. FIGS. 8 and 9 explain this structure.

In the game system 1, a blow strength of a user (see FIG. 3) is increased/decreased based on the manner of whistling selected by the user. FIG. 8 shows one example of a correlation between a manner of whistling and increase/decrease of a blow strength. According to the correlation shown in FIG. 8, the blow strength is increased by two or three when the blow strongly button 54A is selected. The blow strength is increased by one when the blow cheerfully button 54B is selected. The blow strength is decreased by two or three when the blow gently button 54C is selected.

In the game system 1, selection of members of the computer team is controlled based on the blow strength increase/decrease. FIG. 9 shows one example of a correlation between a blow strength and information on selection control for members of the computer team.

In the example shown in FIG. 9, probability information for determining a member of the computer team is correlated to the blow strength as the "information on selection control for members of the computer team". In FIG. 9, "SS", "S", "G", "R", and "N" represent the respective types of player cards, namely, "superstar", "star", "great", "regular", and "normal", respectively.

In the following, assume a case in which the blow strength increase/decrease is at "5". In this case, a player card to be assigned to each position is determined based on the probability information correlated to the blow strength "5". For example, in determination of a player card to be assigned to the position "FW", initially, the type of a player card to be assigned to the position "FW" is determined based on the probability information. For example, as the probability of "superstar" is "1%" in the probability information correlated to the blow strength "5", the probability that the type of a player card to be assigned to the position "FW" will be determined as "superstar" is "1%". Further, for example, when the type of a player card to be assigned to the position "FW" is determined as "superstar", any of the player cards with the position "FW" and the type "superstar" is selected from the player card database. In this manner, a player card to be assigned to each position is determined.

According to the correlation shown in FIG. 9, the probability information correlated to the blow strength "8" shows higher probabilities for "superstar" and "star" than those shown by the probability information correlated to other blow strengths. Therefore, in a case of the blow strength "8", a player card with the type "superstar" or "star" is more likely to be selected as a member of the computer team.

Figure 10:
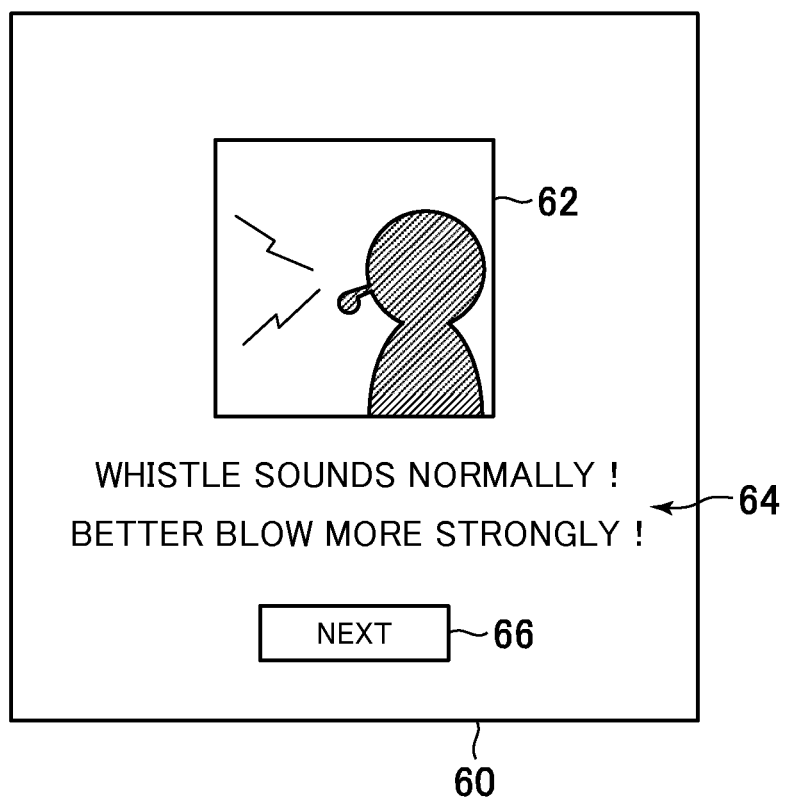
FIG. 10 shows one example of a whistle screen.

When any of the blow strongly button 54A, the blow cheerfully button 54B, and the blow gently button 54C is selected in the whistle obtaining screen 50, a whistle screen 60, such as is shown in FIG. 10, for example, is displayed on the display unit 25. The whistle screen 60 shown in FIG. 10 is one example of a whistle screen that is displayed with the blow strength "5".

As shown in FIG. 10, a message 64 is shown in the whistle screen 60 together with a silhouette image 62 of a character blowing a whistle. The content of the message 64 will be changed based on the blow strength. FIG. 11 shows one example of a correlation between the blow strength and the message 64.

The message 64 serves to give a user a hint for making it more likely that a player card of the type "superstar" or "star" will be selected as a member of the computer team (in other words, to make the blow strength to be "8"). The message 64 shown in FIG. 10 is correlated to the blow strength "5", and thus suggests that the user had better blow a whistle more strongly when the whistle obtaining screen 50 is displayed next. Relying on this message 64, the user can know that it is better to select the blow strongly button 54A when the whistle obtaining screen 50 is displayed next.

Figure 12:
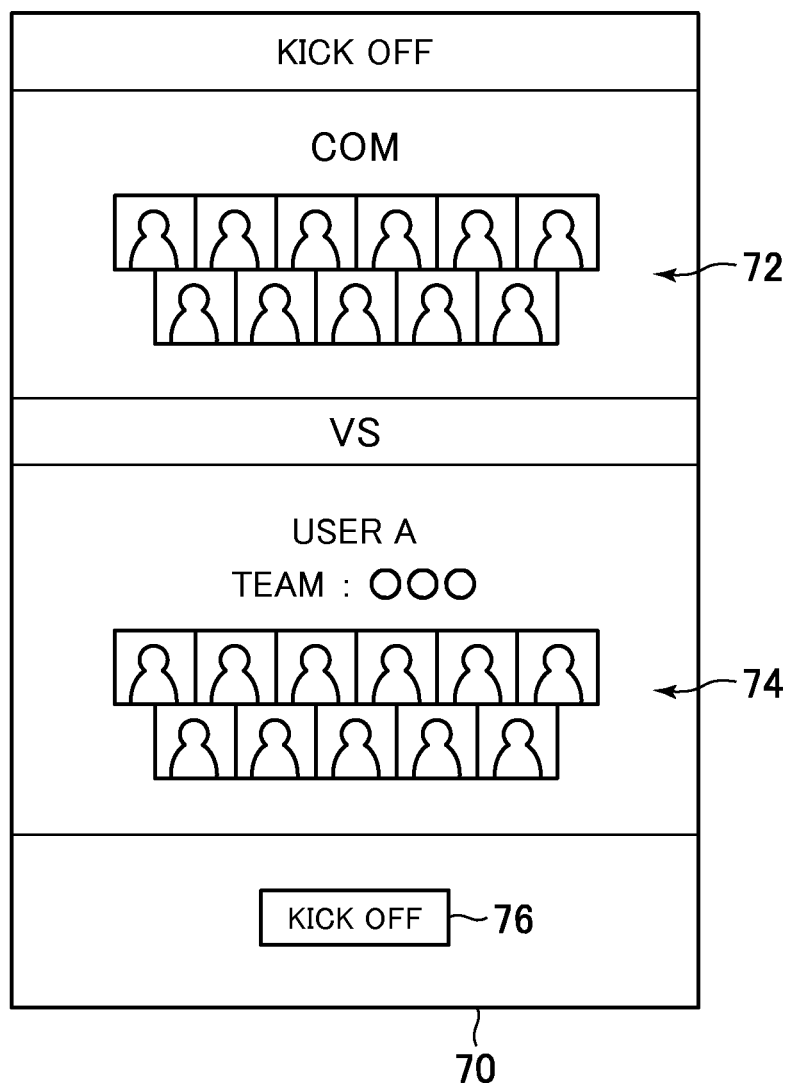
FIG. 12 shows one example of a kick off screen.

As shown in FIG. 10, the whistle screen 60 includes a next button 66. When the next button 66 is selected, a kick off screen 70, such as is shown in FIG. 12, for example, is displayed. As shown in FIG. 12, eleven player cards 72 that are members of the computer team and eleven player cards 74 that are members of the user team are shown in the kick off screen 70.

Further, a kick off button 76 is shown in the kick off screen 70. When the kick off button 76 is selected, a match (a game) is executed between the user team and the computer team. For example, relatively simple simulation processing (match result determination processing) is executed based on eleven player card data sets that are members of the user team and eleven player card data sets that are members of the computer team, or the like, whereby a match result is determined.

Figures 13, 14:
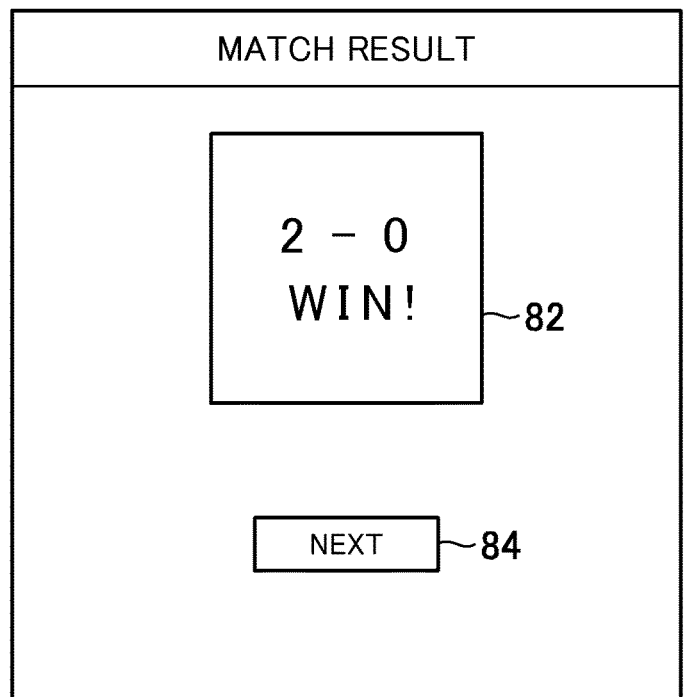
FIG. 13 shows one example of data for setting a strength of a computer team, based on a strength level of the computer team.
FIG. 14 shows one example of a match result screen.

In executing the simulation processing, the strength of the computer team is set based on the value in the "strength level of computer team" field in the user data. For example, FIG. 13 shows one example of data for setting the strength of the computer team based on the value in the "strength level of computer team" field in the user data. In the data shown in FIG. 13, the strength level of the computer team is correlated to the cooperation degree that should be set with respect to the computer team. In the data shown in FIG. 13, a higher strength level of the computer team is correlated to a higher cooperation degree that should be set with respect to the computer team. For example, in a case where the value in the "strength level of computer team" field in the user data is "1", the cooperation degree of the computer team is set to "2".

When the match result is determined, a match result screen indicating the match result is displayed on the display unit 25. FIG. 14 shows one example of the match result screen. As shown in FIG. 14, a match result 82 and a next button 84 are shown in the match result screen 80.

In the game system 1 according to this embodiment, when the user team beats the computer team, any of the eleven player cards that are members of the computer team is given to the user. Therefore, when the user team beats the computer team and the next button 84 is selected, a player selection screen for selecting any of the eleven player cards that are members of the computer team is displayed on the display unit 25. Meanwhile, when the user team does not beat the computer team, no player card is given to the user. Therefore, when the next button 84 in the match result screen 80 is selected, the main screen 30 is displayed on the display unit 25.

Figures 15, 16:
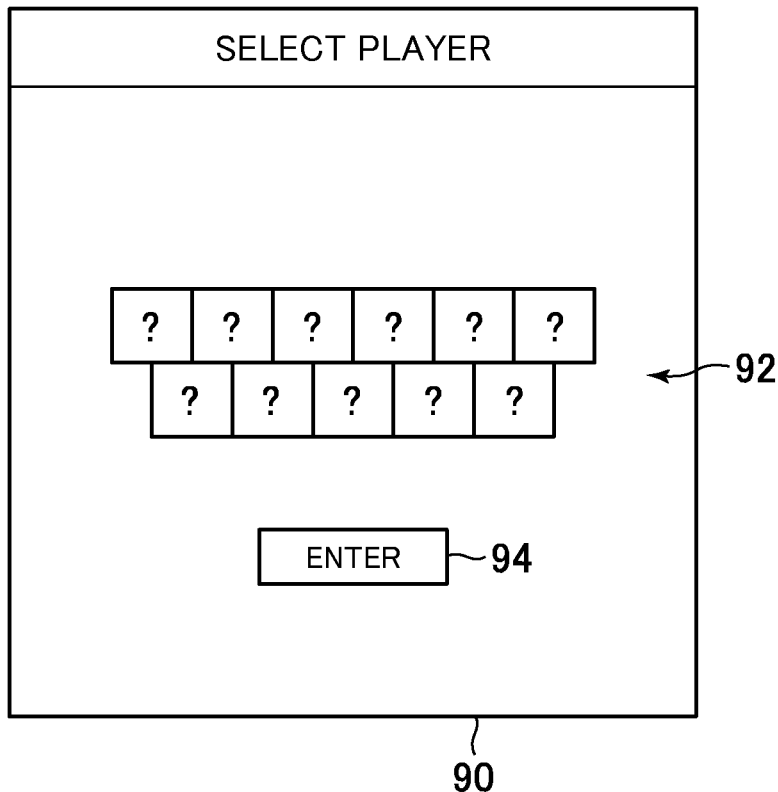
FIG. 15 shows one example of a player selection screen.
FIG. 16 one example of a correlation between the type of a player card given to a user and an extent of increase of the strength level of the computer team.

FIG. 15 shows one example of the player selection screen. As shown in FIG. 15, in the player selection screen 90, eleven player cards 92 that are members of the computer team are shown such that the user cannot know which card is correlated to which player. Then, the user selects any player card in the player selection screen 90, and then selects an enter button 94. In this case, a player obtaining screen (not shown) for presenting to the user the player card selected by the user is displayed on the display unit 25, and the player card is given to the user.

When any of the eleven player cards that are members of the computer team is given to the user, the value in the "strength level of computer team" field in the user data is updated in order to increase the strength of the computer team in the next match between the user team and the computer team.

In this embodiment, the amount of increase of the strength of the computer team is controlled based on the type of the player card given to the user. FIG. 16 shows one example of a correlation between the type of a player card given to a user and the amount of increase of the strength level of the computer team.

According to the correlation shown in FIG. 16, in a case where a player card of the type "great", "star", or "superstar" is given to the user, the strength level of the computer team is increased. Giving the user a player card with higher ability (rarity) results in an increase of the strength of the computer team by a larger amount.

That is, when a player card of the type "superstar" is given to the user, the strength level of the computer is increased to a larger extent compared to a case in which a player card of the type "great" or "star" is given to the user. Further, when a player card of the type "star" is given to the user, the strength level of the computer team is increased to a larger extent compared to a case in which a player card of the type "great" is given to the user.

Figure 17:
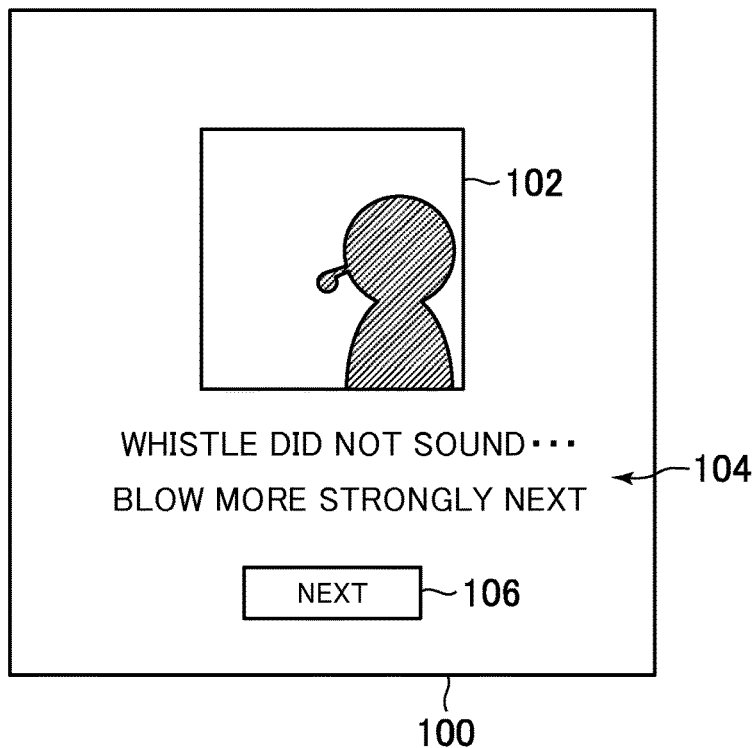
FIG. 17 shows another example of the whistle screen.

In the correlation shown in FIG. 9, no probability information is defined for the blow strengths "0" and "10". In the game system 1, when the blow strength of the user is "0" or "10", it is considered that whistling has failed, and a match against the computer team is not executed. Specifically, when the blow strength of the user is "0" or "10", a failed whistling screen 100, such as is shown in FIG. 17, for example, is displayed. In the failed whistling screen 100, a message 104 informing failed whistling is shown together with a silhouette image 102 of a character that fails whistling. When a next button 106 shown in the failed whistling screen 100 is selected, the main screen 30 is displayed on the display unit 25.

In the game system 1, when either the blow strongly button 54A, the blow cheerfully button 54B, or the blow gently button 54C in the whistle obtaining screen 50 is selected by a user and another user having a friendship with the user accesses the game system 1, the members of the computer team are determined while considering that the blow strength of the user is "8" even though the blow strength of the user is not "8".

Figure 18:
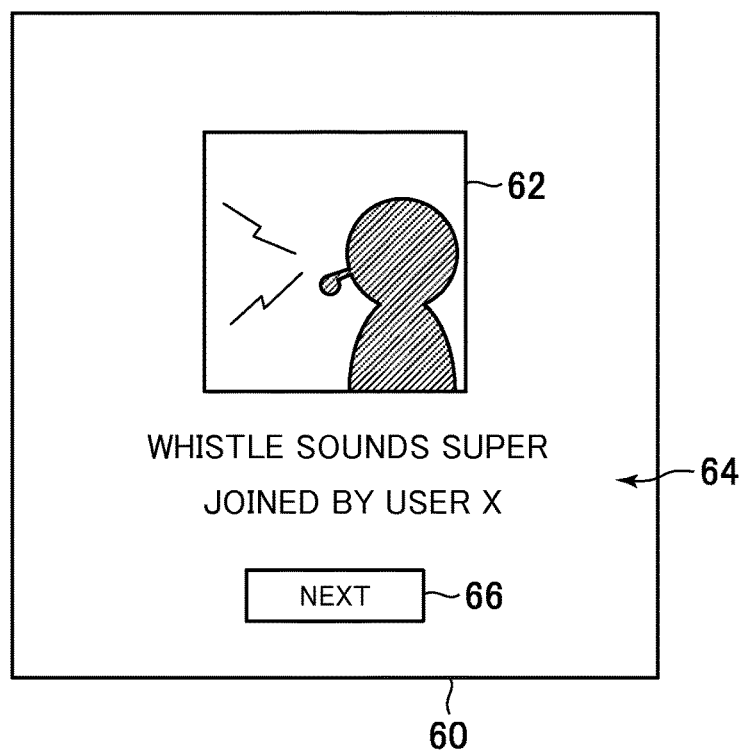
FIG. 18 shows still another example of the whistle screen.

FIG. 18 shows one example of the whistle screen 60 in this case. FIG. 18 shows the whistle screen 60 that is displayed when a user X who has a friendship with the user accesses the game system 1. In this case, the message 64 having content similar to that of a message correlated to the blow strength "8" is displayed. The message 64 informs that the whistle sounds better joined by the user X.

In the game system 1, a special whistle may be given to a user instead of a normal whistle.

Figure 19:
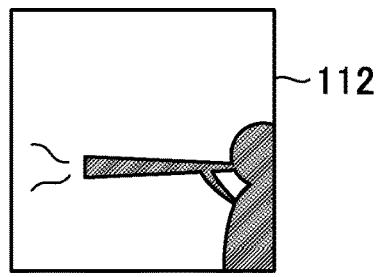
FIG. 19 shows one example of a random whistle obtaining screen.

FIG. 19 shows one example of the special whistle. FIG. 19 shows one example of a random whistle obtaining screen that is displayed on the display unit 25 when a random whistle is given to the user. As shown in FIG. 19, a silhouette image 112 of a character who blows a relatively long whistle is shown in the random whistle obtaining screen 110. The random whistle obtaining screen image 110 shows only the blow button 114. That is, the random whistle obtaining screen 110 is different from the whistle obtaining screen 50 in that the user cannot select a manner of whistling. When the blow button 114 is selected, a manner of whistling is selected at random. For example, either "blow strongly" or "blow gently" is selected at random. Then, the blow strength of the user is increased/decreased based on the manner of whistling selected, and members of the computer team are determined based on the blow strength increase/decrease.

Figure 20:
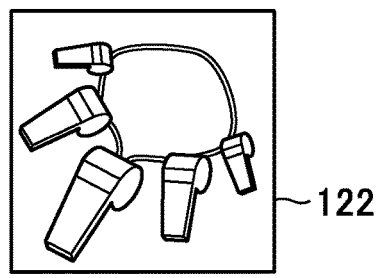
FIG. 20 shows one example of a golden whistle obtaining screen.

FIG. 20 shows another example of the special whistle. FIG. 20 shows one example of a golden whistle obtaining screen that is displayed on the display unit 25 when a golden whistle is given to the user. As shown in FIG. 20, an item image 122 showing the golden whistle is shown in the golden whistle obtaining screen 120. In this embodiment, five golden whistles are given to the user as one set. A probability of obtaining the golden whistle is set significantly lower than that of the normal whistle.

Figures 21, 22:
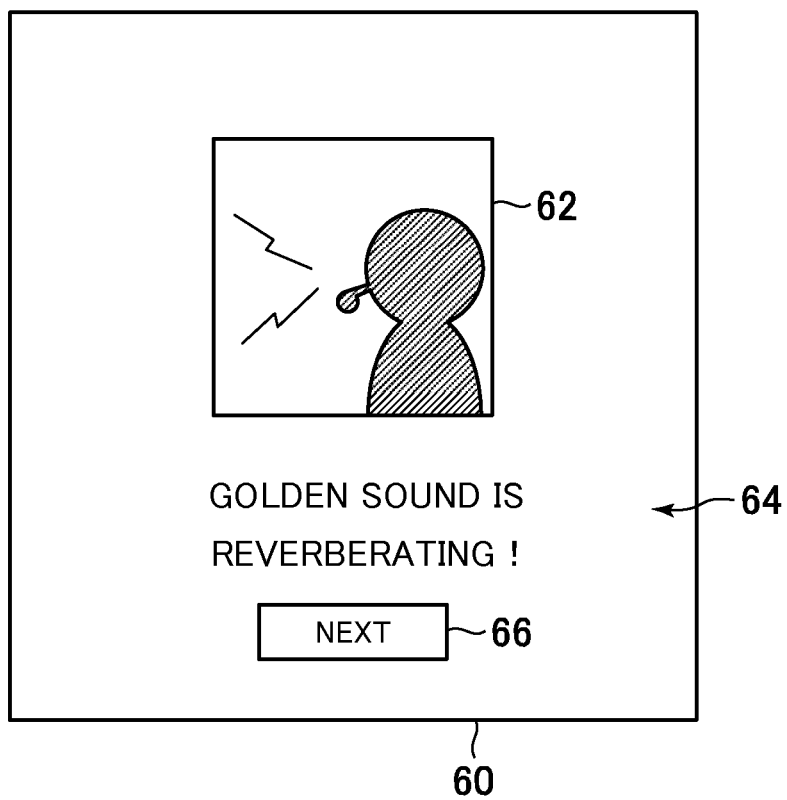
FIG. 21 shows one example of probability information in determining members of the computer team.
FIG. 22 shows another example of the whistle screen.

A blow button 124 is shown in the golden whistle obtaining screen 120. When the blow button 124 is selected, members of the computer team are determined. FIG. 21 shows one example of probability information for use in determining members of the computer team in this case. In the probability information shown in FIG. 21, the probabilities for "regular" and "normal" are set to "0%". Therefore, only a player card of the type "superstar", "star", or "great" is selected as a member of the computer team. Further, in the probability information shown in FIG. 21, the probabilities for "superstar" and "star" are set higher than those in the probability information correlated to the blow strength "8". Therefore, a player card of the type "superstar", "star", or "great" is more likely to be selected as a member of the computer team than in a case with the blow strength "8".

When the blow button 124 in the golden whistle obtaining screen 120 is selected, the whistle screen 60, such as is shown in FIG. 22, for example, is displayed. In the whistle screen 60 shown in FIG. 22, a message 64 is shown that implies by means of the sound of a whistle that the ability (rarity) of the player card selected as a member of the computer team is very high.

When the next button 66 in the whistle screen 60 shown in FIG. 22 is selected, processing similar to that which is executed when the next button 66 in the whistle screen 60 shown in FIG. 10 is executed. That is, a match between the user team and the computer team is executed, and the match result screen 80 is displayed on the display unit 25. When the user team wins, the player selection screen 90 is displayed on the display unit 25. In this case, as only a player card of the type "superstar", "star", or "great" is selected as a member of the computer team as described above, the user can reliably obtain a player card of the type "superstar", "star", or "great".

As described above, the user can receive a chance to obtain a player card with high ability (or rarity) by using the golden whistle. In the game system 1, however, the user cannot use all of the golden whistles by themselves. That is, the user using the golden whistle must transfer the remaining golden whistles to another user.

Figure 23:
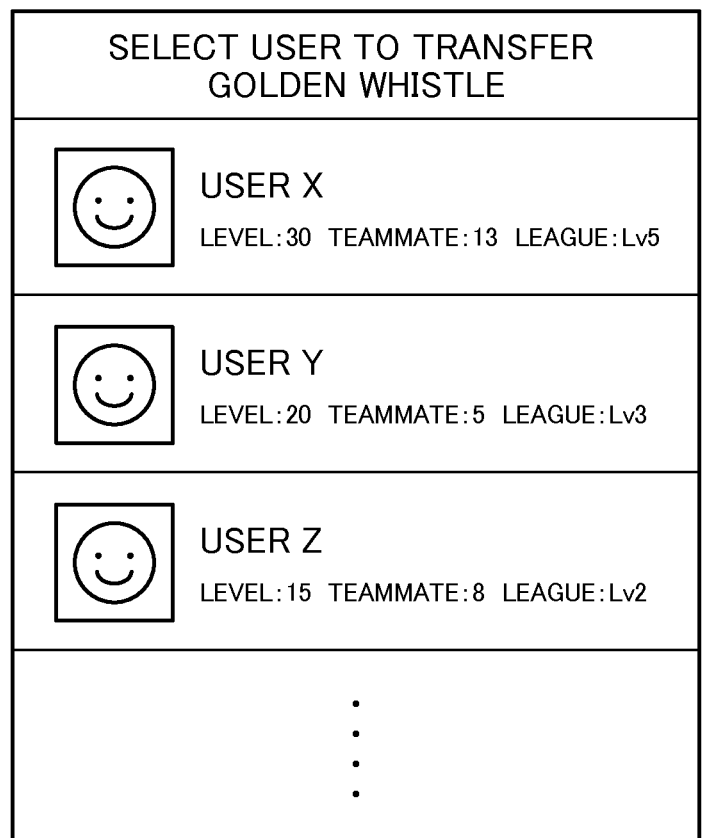
FIG. 23 shows one example of a transferee selection screen.

FIG. 23 shows one example of a transferee selection screen for selecting a person to whom the user transfers the golden whistle. In the transferee selection screen 126, other users having a friendship with the user are shown as candidates to whom the user transfers the golden whistle. When the user selects any of the other users shown in the transferee selection screen 126, the remaining golden whistle is transferred to the selected user.

Figure 24:
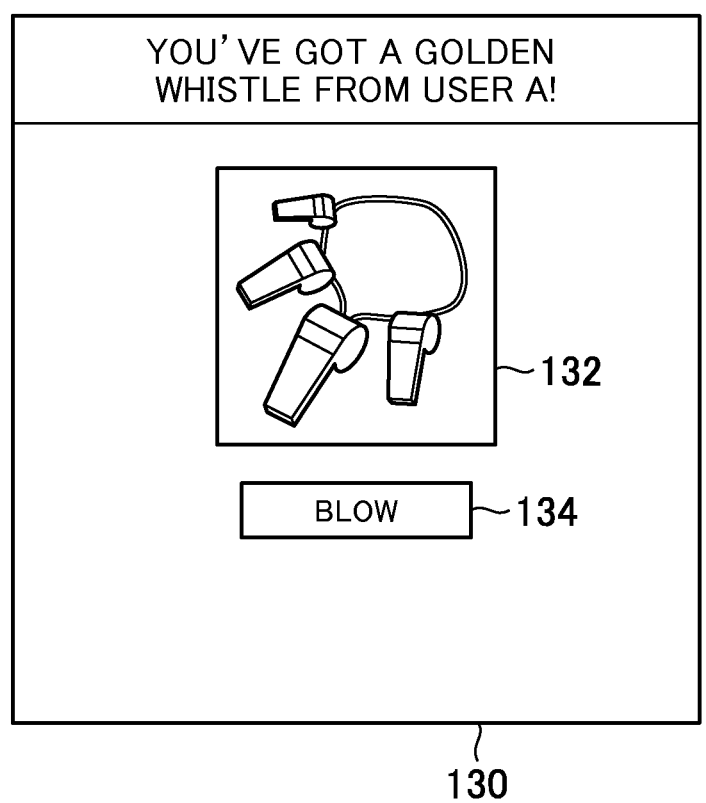
FIG. 24 shows another example of the golden whistle obtaining screen.

When the user to whom the golden whistle is transferred accesses the game system 1, a golden whistle obtaining screen 130, such as is shown in FIG. 24, for example, is displayed. As shown in FIG. 24, an item image 132 showing the golden whistle and a blow button 134 are shown in the golden whistle obtaining screen 130. In this case, the item image 132 indicates the number of golden whistles remaining. Processing that is executed when the blow button 134 is selected is similar to that which is executed when the blow button 124 in the golden whistle obtaining screen 120 shown in FIG. 20 is selected.

Figure 25:
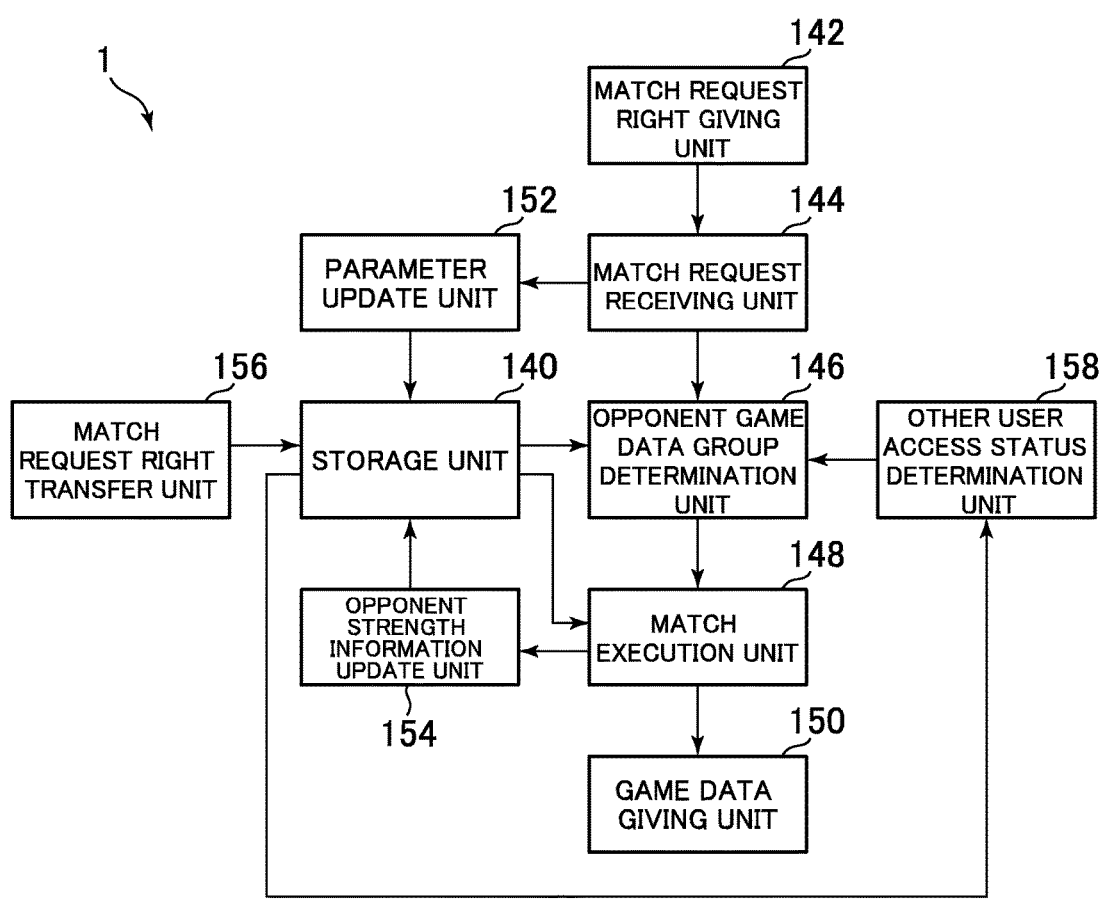
FIG. 25 is a functional block diagram of the game system.

In the following, a structure for implementing the above described functions will be described. FIG. 25 is a functional block diagram mainly showing the functions relevant to the present invention among those implemented in the game system 1. As shown in FIG. 25, the game system 1 includes a storage unit 140, a match request right giving unit 142, a match request receiving unit 144, an opponent game data group determination unit 146, a match execution unit 148, a game data giving unit 150, a parameter update unit 152, an opponent strength information update unit 154, a match request right transfer unit 156, and other user access status determination unit 158.

For example, the storage unit 140 is implemented using at least one of the database 15 and the storage unit 12 of the game server 10. The functional blocks other than the storage unit 140 are implemented by the control unit 11 of the game server 10. That is, the control unit 11 executes processing according to a program, thereby functioning as the functional blocks other than the storage unit 140.

Indispensable functional blocks among the functional blocks shown in FIG. 25 include the storage unit 140, the match request receiving unit 144, the opponent game data group determination unit 146, the match execution unit 148, and the game data giving unit 150, and the other functional blocks may be omitted.

The storage unit 140 will now be described. In the storage unit 140, data that is necessary to execute a game is stored, wherein the storage unit 140 includes, for example, the player card database shown in FIG. 2 and the user database shown in FIG. 3. In addition, data such as is shown in FIGS. 8, 9, 11, 13, 16, and 21, for example, are stored in the storage unit 140.

The match request right giving unit 142 will now be described. The match request right giving unit 142 gives a user a right to request a match that is executed based on the game data group or game data of the user and the opponent game data group. For example, the match request right giving unit 142 gives the user an item that is necessary to request the match. In this embodiment, data on each player card corresponds to the "game data", and data on the eleven player cards selected by the user as player cards for use in the match correspond to the "game data group of the user". That is, the eleven player cards that are members of the user team correspond to the "game data group of the user". Meanwhile, data on the eleven player cards that are members of the opponent team (for example, the computer team) correspond to the "opponent game data group". Further, in this embodiment, the whistle, the random whistle, and the golden whistle correspond to the "item that is necessary to request the match".

The match request receiving unit 144 receives a match request sent from the user terminal 20. For example, the match request receiving unit 144 receives the match request when a user has a right of requesting a match.

Further, the match request receiving unit 144 receives selection of at least one of the plurality of options relevant to the match request. In this embodiment, the three options relevant to the manner of whistling, namely, "blow strongly", "blow cheerfully", and "blow gently", correspond to the above mentioned "plurality of options".

The parameter update unit 152 will now be described. The parameter update unit 152 updates a parameter, which is stored in the storage unit 140 (a parameter storage unit) for storing a parameter so as to be correlated to a user, based on an option selected by the user.

In update of the parameter based on the option, correlation information on a correlation between an option and information on content of parameter update is necessary. In this embodiment, the blow strength corresponds to the above mentioned "parameter", and the information shown in FIG. 8 corresponds to the above mentioned "correlation information".

In this embodiment, the parameter update unit 152 updates the blow strength based on the option selected by the user from among the three options relevant to the manner of whistling, namely, "blow strongly", "blow cheerfully", and "blow gently". The parameter update unit 152 updates the blow strength based on the information shown in FIG. 8.

The other user access status determination unit 158 will now be described. The other user access status determination unit 158 determines whether or not a status of access from another user having a predetermined relationship with the user to the game system 1 (the game server 10) is of a predetermined status.

"Another user having the predetermined relationship with the user" refers to another user registered as a friend (a peer) of the user. "Another user having the predetermined relationship with the user" is determined based on relationship information stored in the storage unit 140 (a relationship information storage unit) for storing the relationship information on a relationship between users. In this embodiment, the "friend list" field in the user data corresponds to the above mentioned "relationship information".

Further, the "case in which the access status is of the predetermined status" refers to a case in which, for example, a period of time elapsed after last access to the game system 1 (the game server 10) by another user having the predetermined relationship with the user is within a predetermined period of time. The "predetermined period of time" is, for example, three minutes, ten minutes, one hour, three hours, or the like, though another period of time may be set as the "predetermined period of time".

The opponent game data group determination unit 146 will now be described. The opponent game data group determination unit 146 determines a plurality of game data sets as members of the opponent game data group.

For example, the opponent game data group determination unit 146 selects a plurality of game data sets to be members of the opponent game data group from among a plurality of game data sets stored in the storage unit 140 (a game data storage unit) for storing the plurality of game data sets.

In this embodiment, the computer team corresponds to the "opponent game data group". That is, the eleven player cards that are members of the computer team correspond to the "opponent game data group", and each player card corresponds to the "game data". That is, the opponent game data group determination unit 146 determines eleven player cards to be members of the computer team.

For example, the opponent game data group determination unit 146 determines eleven player cards to be members of the computer team based on the parameter updated by the parameter update unit 152.

As described above, in this embodiment, the blow strength corresponds to the "parameter updated by the parameter update unit 152". Therefore, the opponent game data group determination unit 146 determines eleven player cards to be members of the computer team based on the blow strength updated by the parameter update unit 152.

In determination of eleven player cards to be members of the computer team based on the blow strength, correlation information on a correlation between the blow strength and information on player card determination control is necessary. In this embodiment, the information shown in FIG. 9 corresponds to the above mentioned "correlation information", and the probability information shown in FIG. 9 corresponds to the above mentioned "information on player card determination control". The opponent game data group determination unit 146 determines eleven player cards to be members of the computer team based on the probability information correlated to the blow strength updated by the parameter update unit 152.

Further, for example, the opponent game data group determination unit 146 determines eleven player cards to be members of the computer team based on a result of determination by the other user access status determination unit 158.

For example, when the status of access from another user having the predetermined relationship with the user to the game server 10 is of the predetermined status, the opponent game data group determination unit 146 makes it more likely that a player card with higher ability (or rarity) will be included in the members of the computer team, compared to a case in which the access status is not of the predetermined status.

For example, when the status of access from another user having the predetermined relationship with the user to the game server 10 is of the predetermined status, the opponent game data group determination unit 146 sets a probability that a player card with higher ability (or rarity) will be determined as the member of the computer team higher, compared to a case in which the access status is not of the predetermined status.

Specifically, when the status of access from another user having the predetermined relationship with the user to the game server 10 is of the predetermined status, the opponent game data group determination unit 146 considers that the blow strength of the user is at a predetermined value, and determines eleven player cards to be members of the computer team. The "predetermined value" here refers to a value that makes a probability that a player card with high ability (or rarity) will be determined as a member of the computer team relatively high. For example, "8", or a value that makes the probability that a player card with high ability (or rarity) will be determined as a member of the computer team highest is set as the above mentioned "predetermined value".

The match execution unit 148 will now be described. When the match request is received, the match execution unit 148 executes a match based on the game data group or game data of the user and the opponent game data group.

As described above, in this embodiment, eleven player cards that are members of the user team correspond to the "game data group of the user", and eleven player cards that are members of the computer team correspond to the "opponent game data group". Therefore, the match execution unit 148 executes a soccer match between the user team and the computer team based on the eleven player cards that are members of the user team and the eleven player cards that are members of the computer team.

The match execution unit 148 executes simple simulation processing (match result determination processing) based on the eleven player cards that are members of the user team and the eleven player cards that are members of the computer team, to determine a result of the match between the user team and the opponent team.

Note that in this embodiment, when the parameter updated by the parameter update unit 152 is at a predetermined value, the opponent game data group determination unit 146 does not determine eleven player cards to be members of the computer team, and the match execution unit 148 does not execute the match. Specifically, when the blow strength updated by the parameter update unit 152 is at "0" or "10", the opponent game data group determination unit 146 does not determine eleven player cards to be members of the computer team, and the match execution unit 148 does not execute the match.

The game data giving unit 150 will now be described. When the match is executed, the game data giving unit 150 gives at least one of the plurality of game data sets that are members of the opponent game data group to the user. For example, the game data giving unit 150 gives at least one of the plurality of game data sets that are members of the opponent game data group to the user based on a result of the match. That is, the game data giving unit 150 registers at least one of the plurality of game data sets that are members of the opponent game data group in the "available player" field of the user data.

In this embodiment, when the user team beats the computer team, the game data giving unit 150 gives a player card selected by the user from among the eleven player cards that are members of the computer team to the user.

The opponent strength information update unit 154 updates strength information such that the strength of the opponent game data group in the next match is improved. The strength information is information on the strength of the opponent game data group and is stored in the storage unit 140 (a strength information storage unit) for storing the strength information so as to be correlated to the user.

The opponent strength information update unit 154 executes the above mentioned update in at least one of (a) a case in which the match is executed, (b) a case in which the user wins the match, (c) a case in which the game data giving unit 150 gives game data to the user, and (d) a case in which the game data given to the user by the game data giving unit 150 is predetermined game data.

In this embodiment, the "strength level of computer team" field in the user data corresponds to the above mentioned "strength information". When any of the eleven player cards that are members of the computer team is given to the user, the opponent strength information update unit 154 increases the strength level of the computer team such that the strength of the computer team in the next match is improved.

For example, the opponent strength information update unit 154 determines the amount of increase of the strength level of the computer team when increasing the strength level of the computer team, based on a type of the player card given to the user.

In determination of the amount of increase of the strength of the computer team based on the type of the player card given to the user, correlation information on a correlation between a type of a player card and information on an amount of increase of the strength of the computer team is necessary. In this embodiment, the information shown in FIG. 16 corresponds to the above mentioned "correlation information".

Note that the opponent strength information update unit 154 determines whether or not it becomes a predetermined time or a predetermined time and date, and updates the strength level of the computer team so as to be decreased when it becomes the predetermined time or the predetermined time and date. For example, when it becomes three o'clock in the morning, the opponent strength information update unit 154 decreases the strength level of the computer team to a predetermined level (for example, the lowest level). The opponent strength information update unit 154 may decrease the strength level of the computer team by a predetermined amount (for example, 3).

The match request right transfer unit 156 will now be described. The match request right transfer unit 156 executes transfer processing for transferring a right held by a user (a right of requesting a match) to another user. For example, the match request right transfer unit 156 executes the transfer processing for transferring the right to another user having the predetermined relationship with the user holding the right, based on the relationship information.

"Another user having the predetermined relationship with the user" refers to another user who is registered as a friend (a peer) of the user. "Another user having the predetermined relationship with the user" is determined based on relationship information stored in the storage unit 140 (the relationship information storage unit) for storing the relationship information on a relationship between users. In this embodiment, the "friend list" field in the user data corresponds to the above mentioned "relationship information".

In this embodiment, the match request right transfer unit 156 executes the transfer processing for transferring an item necessary to request the match (the golden whistle) to another user having a friendship.

In the following, processing that is executed in the game system 1 will be described. The control unit 11 of the game server 10 executes processing described below according to a program, thereby functioning as the functional blocks (except the storage unit 140) shown in FIG. 25.

Figure 26:
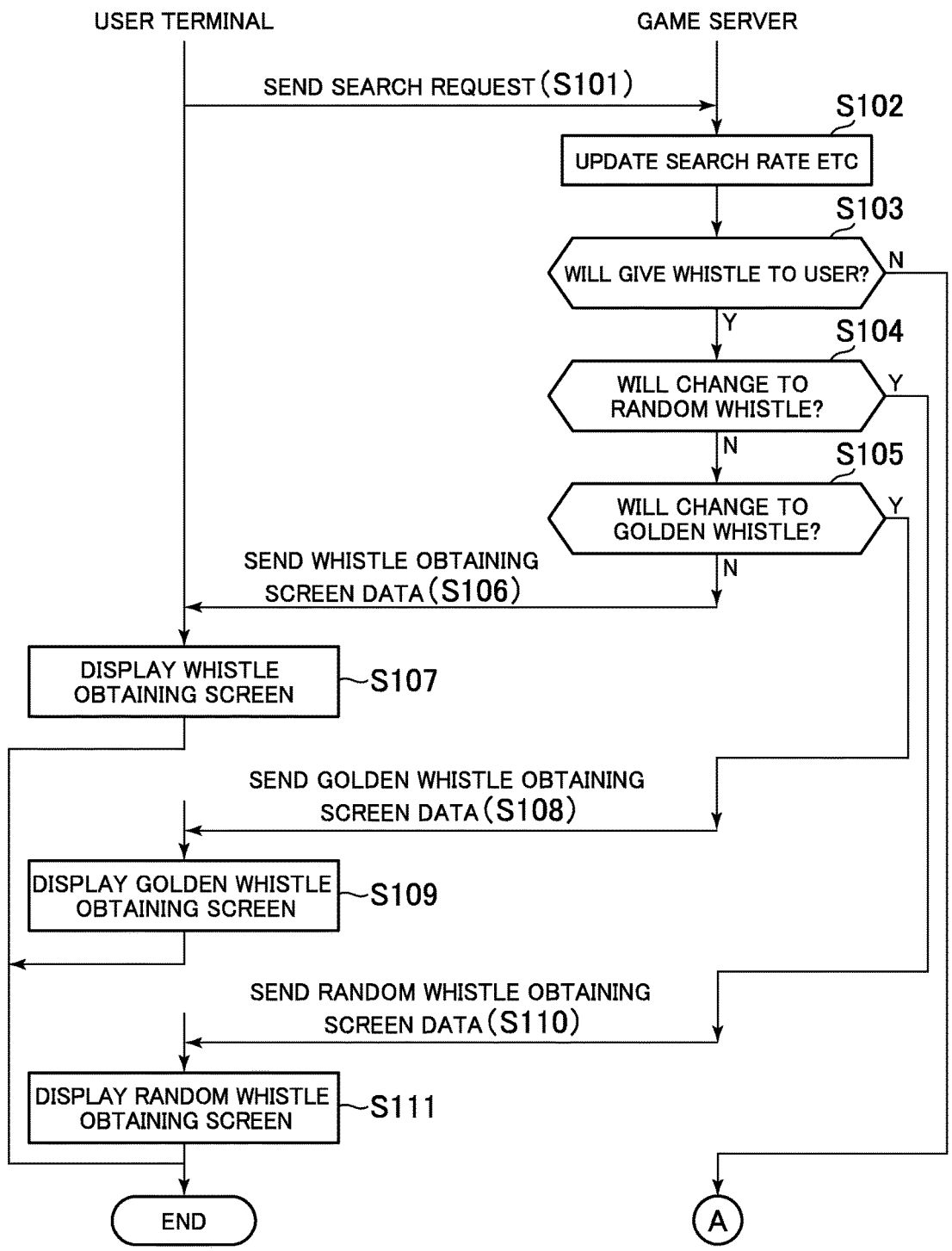
FIG. 26 shows one example of processing executed in the game system.
Figure 27:
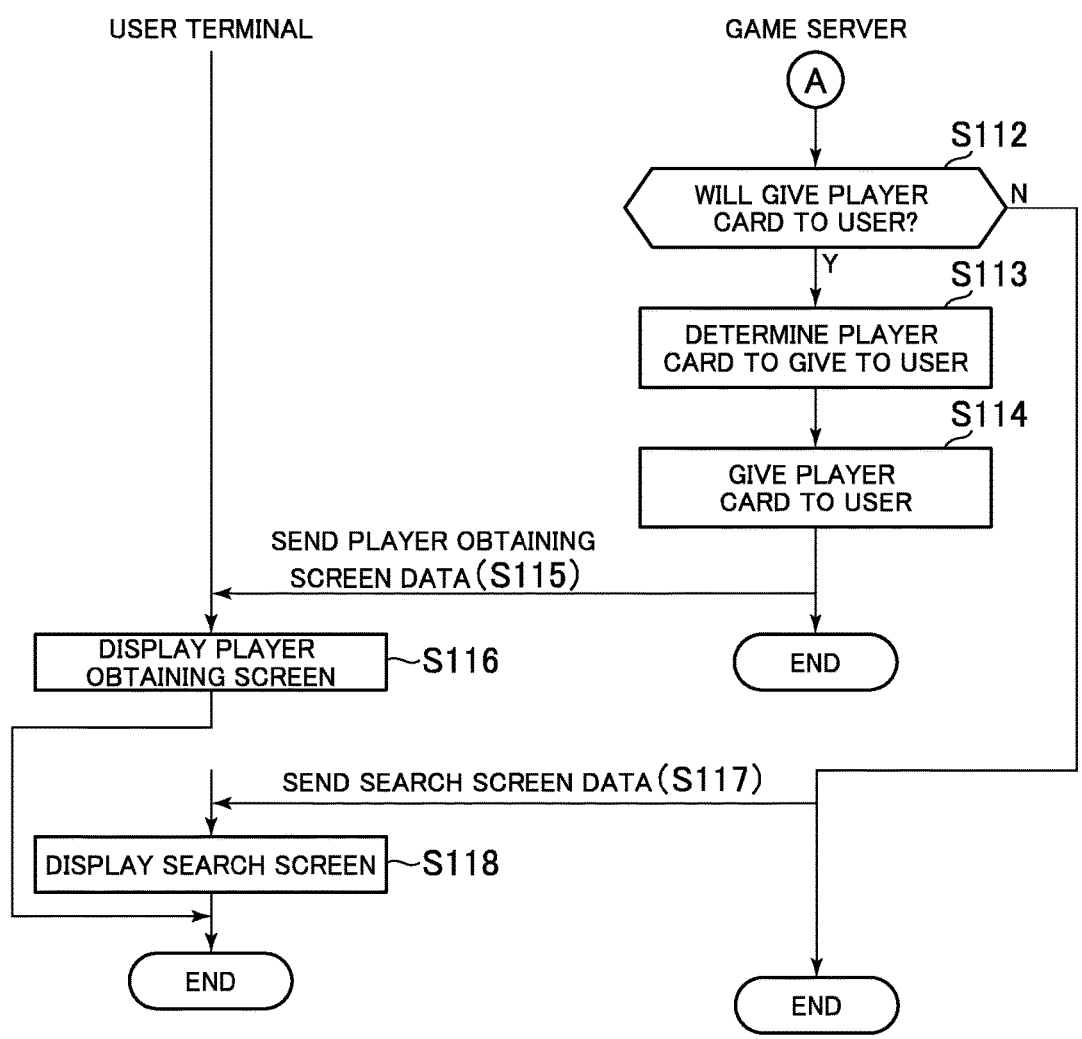
FIG. 27 shows one example of processing executed in the game system.

FIGS. 26 and 27 show processing that is executed in the game system 1 when the search button 42 in the search screen 40 is selected.

When the search button 42 in the search screen 40 is selected, the control unit 21 of the user terminal 20 sends a search request to the game server 10, as shown in FIG. 26 (S101). In this case, a user ID is sent to the game server 10. When the search request is received in the game server 10, the control unit 11 updates the search rate, the experience value, and the action point (S102). When the search rate becomes a predetermined value (for example, 100), the control unit 11 permits the user to move to the next search area.

When step S102 is executed, the control unit 11 determines whether or not to give a whistle to the user (S103). Specifically, the control unit 11 determines whether or not to give a whistle to the user based on probability information, for example. In this probability information, a probability of giving a whistle to the user is set to a predetermined probability (for example, 20%).

When it is determined to give a whistle to the user, the control unit 11 determines whether or not to change the whistle to be given to the user to the random whistle (S104). Specifically, the control unit 11 determines whether or not to change the whistle to the random whistle based on probability information, for example. In this probability information, a probability of changing the whistle to the random whistle is set to a predetermined probability (for example, 20%).

When it is determined not to change the whistle to be given to the user to the random whistle, the control unit 11 determines whether or not to change the whistle to be given to the user to the golden whistle (S105). Specifically, the control unit 11 determines whether or not to change the whistle to the golden whistle based on probability information, for example. In this probability information, a probability of changing the whistle to the golden whistle is set to a predetermined probability (very low probability: for example, 1%).

When it is determined not to change the whistle to be given to the user to the golden whistle, the control unit 11 sends screen data on the whistle obtaining screen 50 to the user terminal 20 (S106). When the screen data on the whistle obtaining screen 50 is received in the user terminal 20, the control unit 21 displays the whistle obtaining screen 50 on the display unit 25 (S107).

Meanwhile, when it is determined to change the whistle to be given to the user to the golden whistle, the control unit 11 sends screen data on the golden whistle obtaining screen 120 to the user terminal 20 (S108). When the screen data on the golden whistle obtaining screen 120 is received in the user terminal 20, the control unit 21 displays the golden whistle obtaining screen 120 on the display unit 25 (S109).

When it is determined at step S104 to change the whistle to be given to the user to the random whistle, the control unit 11 sends screen data on the random whistle obtaining screen 110 to the user terminal 20 (S110). When the screen data on the random whistle obtaining screen 110 is received in the user terminal 20, the control unit 21 displays the random whistle obtaining screen 110 on the display unit 25 (S111).

When it is determined at the above mentioned at S103 not to give a whistle to the user, the control unit 11 determines whether or not to give a player card to the user, as shown in FIG. 27 (S112). Specifically, the control unit 11 determines whether or not to give a player card to the user based on probability information, for example. In this probability information, a probability of giving a player card to the user is set to a predetermined probability (for example, 20%).

When it is determined to give a player card to the user, the control unit 11 determines at random a player card to be given to the user from among the player cards stored in the player card database (S113). Then, the control unit 11 gives the player card determined at step S113 to the user (S114). That is, the control unit 11 registers the player card determined at step S113 in the "available player" field in the user data.

Further, the control unit 11 sends to the user terminal 20 screen data on the player obtaining screen (not shown) for presenting to the user the player card determined at step S113 (S115). When the screen data on the player obtaining screen is received in the user terminal 20, the control unit 21 displays the player obtaining screen on the display unit 25 (S116).

Meanwhile, when it is determined at step S112 not to give a player card to the user, the control unit 11 sends screen data on the search screen 40 to the user terminal 20 (S117). When the screen data on the search screen 40 is received in the user terminal 20, the control unit 21 displays the search screen 40 on the display unit 25 (S118). In the search screen 40 in this case, the search rate, the experience value, the action point, or the like, all updated at step S102, are shown. With the above, explanation on this processing is finished.

Figure 28:
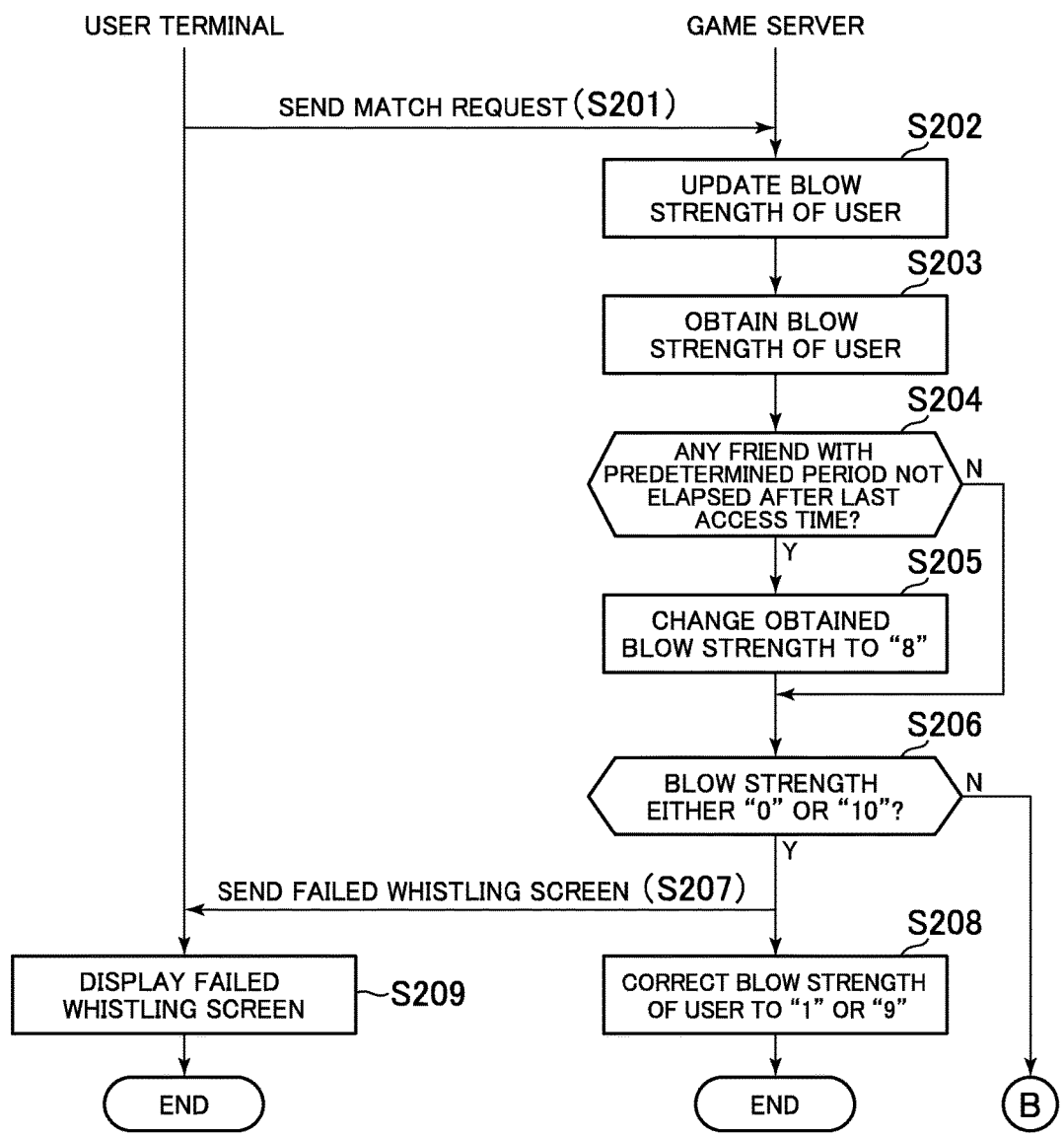
FIG. 28 shows one example of processing executed in the game system.
Figure 29:
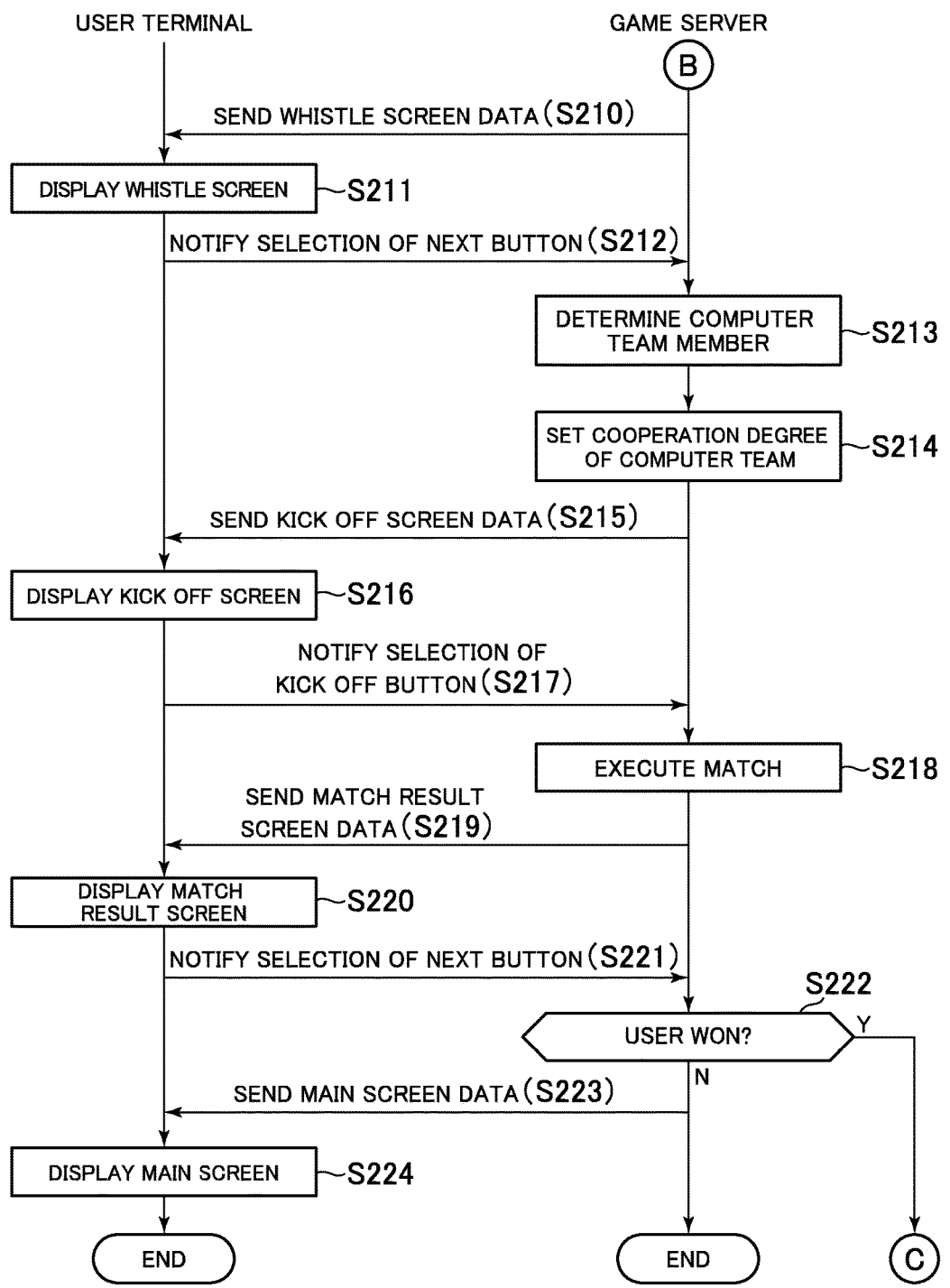
FIG. 29 shows one example of processing executed in the game system.
Figure 30:
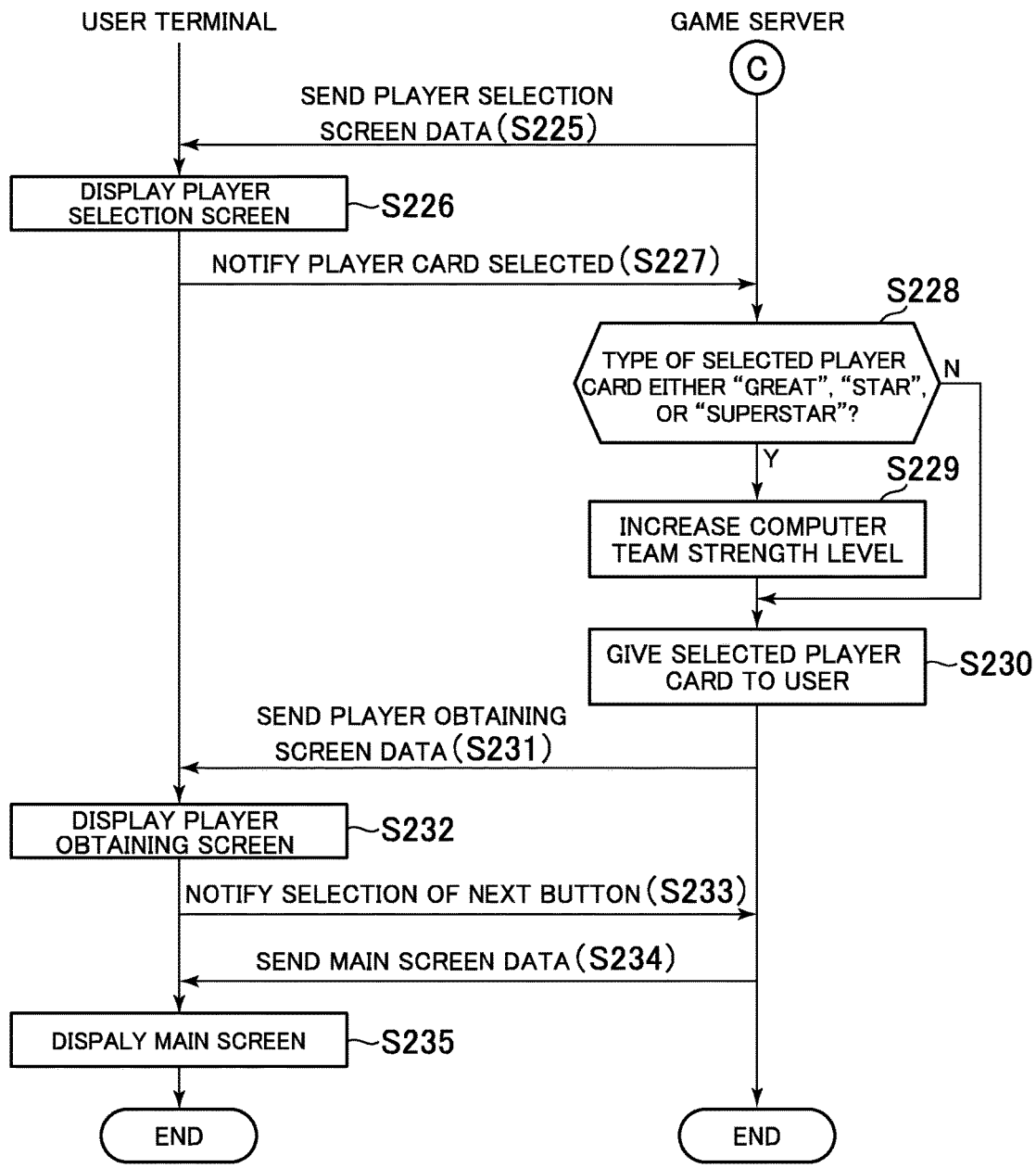
FIG. 30 shows one example of processing executed in the game system.

FIGS. 28 to 30 show processing that is executed in the game system 1 when any of the blow strongly button 54A, the blow cheerfully button 54B, and the blow gently button 54C in the whistle obtaining screen 50 is selected.

When any of the blow strongly button 54A, the blow cheerfully button 54B, and the blow gently button 54C in the whistle obtaining screen 50 is selected, the control unit 21 of the user terminal 20 sends a match request to the game server 10 (S201). For example, the control unit 21 sends the user ID and information indicating the button selected by the user (that is, the manner of whistling selected by the user) to the game server 10.

When the match request is received in the game server 10, the control unit 11 updates the value in the "blow strength" field in the user data (S202). Specifically, the control unit 11 refers the information shown in FIG. 8, and increases or decreases the value in the "blow strength" field in the user data by an amount corresponding to the button selected by the user (that is, the manner of whistling selected by the user). Further, after execution of step S202, the control unit 11 obtains the value in the "blow strength" field in the user data (S203).

After execution of step S203, the control unit 11 determines whether there is a user with a predetermined period of time (for example, one hour) not elapsed after their last access time and date among the other users having a friendship with the user (S204). When it is determined that there is such a user, the control unit 11 changes the blow strength obtained at the step S203 to "8" (S205).

Note that although it is described here that the blow strength is always changed to "8" when there is a user with a predetermined period of time (for example, one hour) not elapsed after their last access time and date, whether or not to change the blow strength to "8" may be determined based on predetermined probability information. Further, in this case, a probability of determining to change the blow strength to "8" may be changed based on the number of such users as described above. For example, a higher probability may be set when there are a larger number of such users.

When step S205 is executed or when it is determined at step S204 that there is not such a user as described above, the control unit 11 determines whether or not the blow strength obtained at step S203 (or the blow strength changed at step S205) is either "0" or "10" (S206).

When it is determined that the blow strength is either "0" or "10", the control unit 11 restricts execution of a match. That is, when it is determined that the blow strength, or a parameter stored so as to be correlated to the user, is at a predetermined value ("0" or "10"), the control unit 11 does not execute a match. Specifically, the control unit 11 sends screen data on the failed whistling screen 100 to the user terminal 20 (S207). Further, the control unit 11 corrects the value in the "blow strength" field in the user data to "1" or "9" (S208). For example, when the value in the "blow strength" field in the user data is "0", the control unit 11 changes the value in the "blow strength" field to "1". Meanwhile, when the value in the "blow strength" field in the user data is "10", for example, the control unit 11 changes the value in the "blow strength" field to "9".

When the screen data on the failed whistling screen 100 is received in the user terminal 20, the control unit 21 displays the failed whistling screen 100 on the display unit 25 (S209).

When it is not determined at step S206 that the blow strength is at either "0" or "10", the control unit 11 sends screen data on the whistle screen 60 to the user terminal 20, as shown in FIG. 29 (S210). When the screen data on the whistle screen 60 is received in the user terminal 20, the control unit 21 displays the whistle screen 60 on the display unit 25 (S211). When the next button 66 in the whistle screen 60 is selected, the control unit 21 notifies the game server 10 of selection of the next button 66 (S212).

When the above described notice is received in the game server 10, the control unit 11 determines eleven player cards to be members of the computer team (S213). The control unit 11 refers to the information shown in FIG. 9, and obtains probability information correlated to the blow strength obtained at step S203 (or the blow strength changed at step S205). The control unit 11 selects eleven player cards to be members of the computer team from among the player cards stored in the player card database based on the probability information.

Further, the control unit 11 sets a cooperation degree of the computer team (S214). Specifically, the control unit 11 refers to the information shown in FIG. 13, and obtains a cooperation degree corresponding to the value in the "strength level of computer team" field in the user data. The control unit 11 sets the obtained cooperation degree as a cooperation degree of the computer team.

After execution of step S214, the control unit 11 sends screen data on the kick off screen 70 to the user terminal 20 (S215). When the screen data on the kick off screen 70 is received in the user terminal 20, the control unit 21 displays the kick off screen 70 on the display unit 25 (S216). When the kick off button 76 in the kick off screen 70 is selected, the control unit 21 notifies the game server 10 of selection of the kick off button 76 (S217).

When the above described notice is received in the game server 10, the control unit 11 executes a match between the user team and the computer team (S218). For example, the control unit 11 executes simple simulation processing based on the eleven player cards that are members of the user team and the eleven player cards that are members of the computer team, to thereby determine a result of the match between the user team and the opponent team.

After execution of step S218, the control unit 11 sends screen data on the match result screen 80 to the user terminal 20 (S219). When the screen data on the match result screen 80 is received in the user terminal 20, the control unit 21 displays the match result screen 80 on the display unit 25 (S220).

When the next button 84 in the match result screen 80 is selected, the control unit 21 notifies the game server 10 of selection of the next button 84 (S221). When the notice is received in the game server 10, the control unit 11 determines whether or not the user wins the match (S222).

When the user does not win the match, the control unit 11 sends screen data on the main screen 30 to the user terminal 20 (S223). When the screen data on the main screen 30 is received in the user terminal 20, the control unit 21 displays the main screen 30 on the display unit 25 (S224).

Meanwhile, when the user wins the match, the control unit 11 sends screen data on the player selection screen 90 to the user terminal 20, as shown in FIG. 30 (S225). When the screen data on the player selection screen 90 is received in the user terminal 20, the control unit 21 displays the player selection screen 90 on the display unit 25 (S226).

When the enter button 94 in the player selection screen 90 is selected, the control unit 21 notifies the player card selected by the user (S227). In this case, the user ID and the player ID of the player card selected by the user are notified to the game server 10. When the notice is received in the game server 10, the control unit 11 determines whether or not the type of the player card selected by the user is any of "great", "star", and "superstar" (S228).

When the type of the player card selected by the user is any of "great", "star", and "superstar", the control unit 11 increases the value in the "strength level of computer team" field in the user data, to thereby increase the strength level of the computer team in the next match (S229). In this case, the control unit 11 sets the amount of increase of the value in the "strength level of computer team" field based on the type of the player card selected by the user and the information shown in FIG. 16.

When step S229 is executed or when it is not determined at step S228 that the type of the player card selected by the user is any of "great", "star", and "superstar", the control unit 11 gives the player card selected by the user to the user (S230). That is, the control unit 11 registers the player card selected by the user in the "available player" field in the user data.

After execution of step S230, the control unit 11 sends to the user terminal 20 screen data on the player obtaining screen (not shown) showing that the player card selected by the user is given to the user (S231). When the screen data on the player obtaining screen is received in the user terminal 20, the control unit 21 displays the player obtaining screen on the display unit 25 (S232).

When the next button in the player obtaining screen is selected, the control unit 21 notifies the game server 10 of selection of the next button (S233). When the notice is received in the game server 10, the control unit 11 sends screen data on the main screen 30 to the user terminal 20 (S234). When the screen data on the main screen 30 is received in the user terminal 20, the control unit 21 displays the main screen 30 on the display unit 25 (S235). With the above, explanation on this processing is finished.

Processing that is executed in the game system 1 when the blow button 114 in the random whistle obtaining screen 110 is selected will now be described. This processing is similar to the processing (see FIGS. 28 to 30) that is executed when any of the blow strongly button 54A, the blow cheerfully button 54B, and the blow gently button 54C in the whistle obtaining screen 50 is selected. However, when the blow button 114 in the random whistle obtaining screen 110 is selected, either one of the "blow strongly" and "blow gently" is selected at random before executing the processing at step S202.

Figure 31:
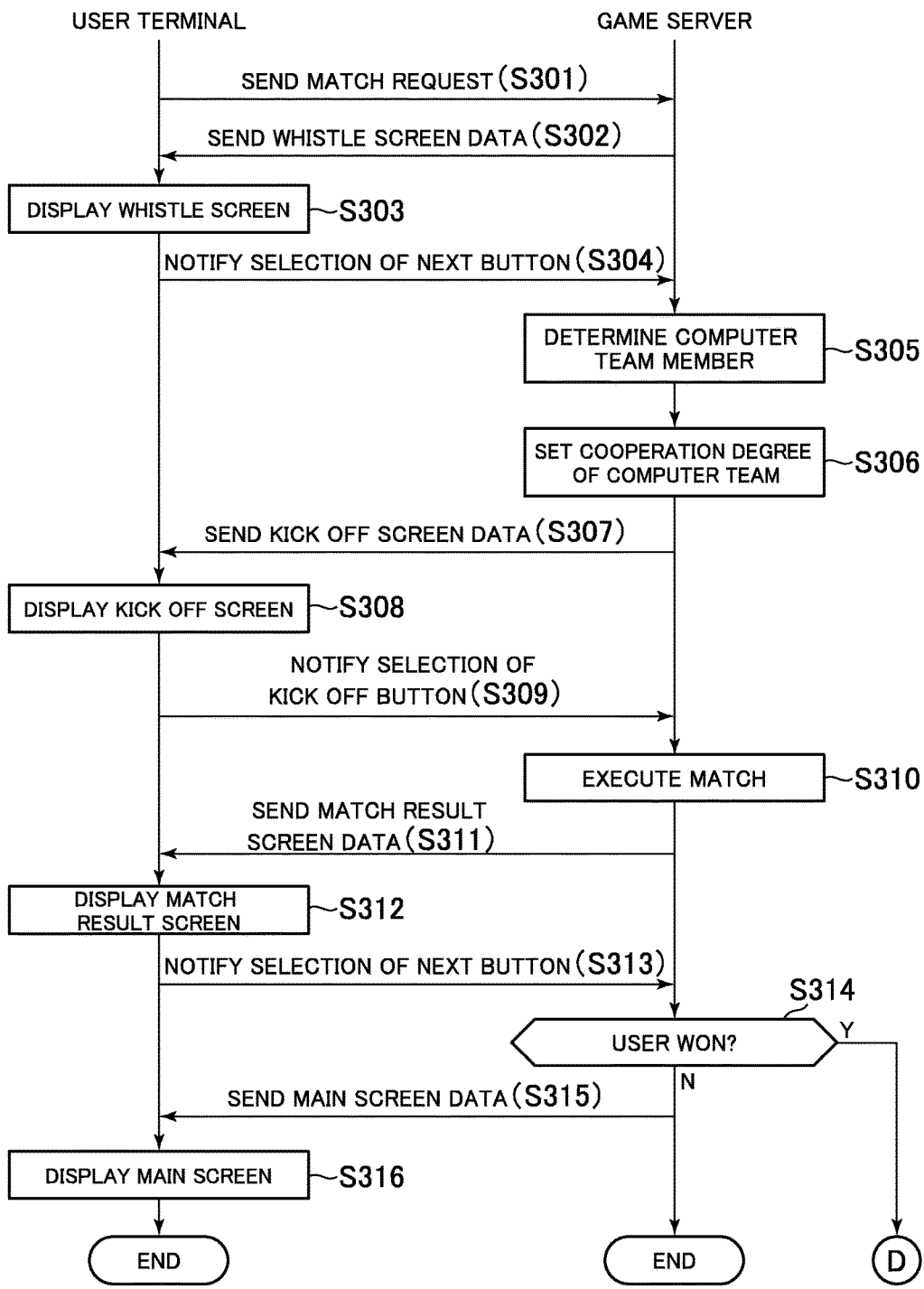
FIG. 31 shows one example of processing executed in the game system.
Figure 32:
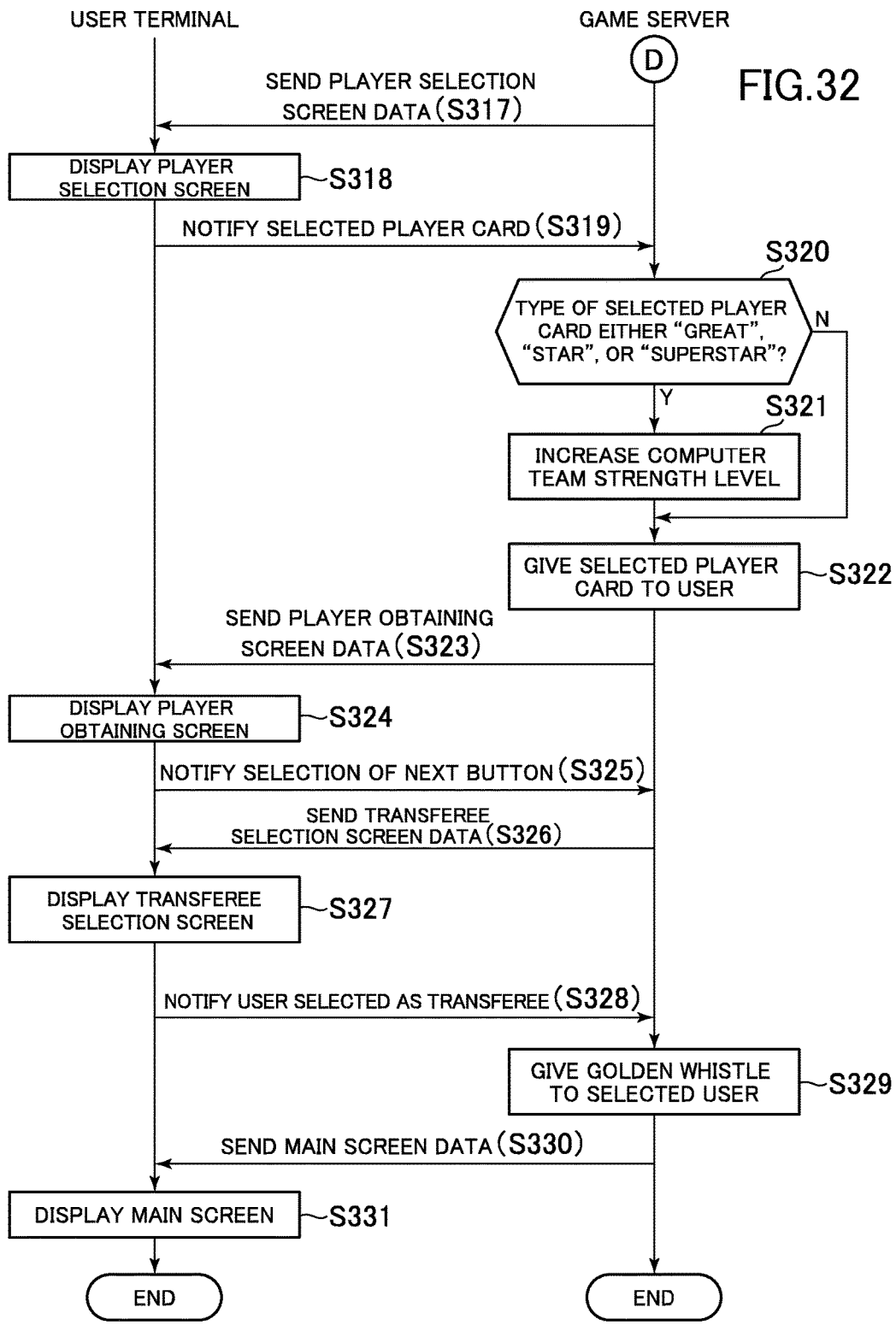
FIG. 32 shows one example of processing executed in the game system.

Processing that is executed in the game system 1 when the blow button 124 in the golden whistle obtaining screen 120 is selected will now be described. FIGS. 31 and 32 show processing that is executed in the game system 1 when the blow button 124 in the golden whistle obtaining screen 120 is executed.

When the blow button 124 in the golden whistle obtaining screen 120 is selected, the control unit 21 sends a match request to the game server 10, as shown in FIG. 31 (S301). In this case, the user ID is sent to the game server 10.

When the match request is received in the game server 10, the control unit 11 executes steps S302 to S316. Steps S302 to S316 and steps S210 to S224 in FIG. 29 are basically similar to each other except step S305. Therefore, only step S305 will be described here.

At step S305, the control unit 11 obtains probability information by referring to the information shown in FIG. 21, and determines eleven player cards to be members of the computer team based on the probability information. At step S305, it may be ensured that at least one player card of the type "superstar" is included in the eleven player cards determined as the members of the computer team. Further, it may be ensured that not more than six player cards of the type "superstar" are included in the eleven player cards determined as the members of the computer team.

When it is determined at step S314 that the user has won the match, the control unit 11 executes steps S317 to S325, as shown in FIG. 32. Steps S317 to S325 are basically similar to S225 to S223 in FIG. 30, and therefore not described here.

When step S325 is executed, the control unit 11 sends to the user terminal 20 screen data on the transferee selection screen 126 for selecting a person to whom the user transfers the golden whistle (S326). When the screen data on the transferee selection screen 126 is received in the user terminal 20, the control unit 21 displays the transferee selection screen 126 on the display unit 25 (S327).

When any user is selected as the transferee with regard to the golden whistle in the transferee selection screen 126, the control unit 21 notifies the game server 10 of the user selected as the transferee (S328). In this case, the user ID of the user who transfers the golden whistle and the user ID of the user selected as the transferee with regard to the golden whistle are notified to the game server 10.

When the above mentioned notice is received in the game server 10, the control unit 11 gives the golden whistle to the user selected as the transferee (S329). For example, the control unit 11 generates transfer data, such as is shown in FIG. 33, and stores in the database 15. The transfer data shown in FIG. 33 includes the user ID of the user (a transferee user) selected as the transferee with regard to the golden whistle, the user ID of the user (a transferor user) who transfers the golden whistle to the transferee user, the item ID of the golden whistle, and an item parameter (the number of items remaining) of the golden whistle.

In the next access to the game server 10 by the user selected as the transferee with regard to the golden whistle, the transfer data shown in FIG. 33 is referred to, and the golden whistle obtaining screen 130, such as is shown in FIG. 24, is displayed in the user terminal 20 of the selected user.

After execution of step S329, the control unit 11 executes steps S330 and 331. Steps S330 and S331 are similar to steps S234 and S235 in FIG. 30, and thus not described here. With the above, explanation of this processing is finished.

According to the above described game system 1, when a match is executed between the user team and the computer team, it is possible to give at least one of the eleven player cards that are members of the computer team to the user.

Further, in the game system 1, the blow strength parameter, or an internal parameter, is changed depending on the manner of whistling selected by the user. The game system 1 makes it more likely or unlikely that a player card with higher ability (or rarity) will be selected as a member of the computer team based on the blow strength parameter. According to the game system. 1, it is possible to make it amusing for a user to adjust an internal parameter such that a player card with higher ability (or rarity) is more likely to be selected as a member of the computer team.

Further, in the game system 1, a situation in which a match itself is not executed may be caused based on the blow strength parameter. According to the game system 1, it is possible to make it amusing for a user to adjust an internal parameter such that a player card with higher ability (or rarity) is more likely to be selected as a member of the computer team, while avoiding the situation in which a match itself is not executed.

Further, in the game system 1, the computer team is made stronger for the next match every time a player card with high ability (or rarity) is given to the user, to thereby make it more difficult for the user to win the next match. That is, although giving too many player cards with high ability (or rarity) to the user may deteriorate a game balance, this inconvenience can be avoided in the game system 1.

Further, in the game system 1, in making the computer team stronger for the next match, giving a player card with higher ability (or rarity) to the user results in an increase of the strength by a larger amount. That is, according to the game system 1, it is possible to avoid a situation in which too many play cards with high ability (or rarity) are given to the user.

Note that in the game system 1, the strength of the computer team is initialized at a predetermined time (for example, at three o'clock in the morning). Therefore, according to the game system 1, it is possible to avoid a situation in which too many player cards with high ability (or rarity) are given to the user within a certain period of time.

Further, in the game system. 1, a player card with high ability (or rarity) is more likely to be selected as a member of the computer team depending on an access status of another user having a friendship with the user. Therefore, according to the game system 1, it is possible to enable the user to realize the sense of connection between users more strongly.

Note that the present invention is not limited to the above described embodiment.

First Modified Example

It is described in the above described embodiment that the game data giving unit 150 gives any of the eleven player cards that are members of the computer team to a user when the user wins a match. However, the game data giving unit 150 is not limited to this aspect.

For example, the game data giving unit 150 may determine the number of player cards to be given to a user from among the eleven player cards that are members of the computer team based on a result of a match. Specifically, when the user wins the match and the difference in the score between the user team and the computer team is larger, a larger number of player cards may be given to the user. Alternatively, a larger number of cards may be given to a user when the user wins a match than the number of player cards to be given to the user when the user does not win a match. For example, two player cards may be given to a user when the user wins a match, and one when the user does not win a match.

In order to implement the above described aspect, correlation information on a correlation between a result of a match and the number of player cards to be given to a user is necessary. The game data giving unit 150 determines the number of player cards to be given to the user based on the correlation information and the result of the match.

Second Modified Example

It is described in the above described embodiment that the game data giving unit 150 gives to a user a player card selected by the user from among the eleven player cards that are members of the computer team. However, the game data giving unit 150 is not limited to this aspect. For example, the game data giving unit 150 may select at least one of the eleven player cards that are members of the computer team based on probability information, and give the selected player card to the user. The probability information in this case may be, for example, similar to that shown in FIGS. 9 and 21.

In the second modified example, the probability information may be changed based on a result of a match. For example, when the user wins the match, a probability of giving a player card with high ability (or rarity) to the user may be increased, compared to a case where the user does not win a match. Further, for example, when the user wins the match and the difference in the score between the user team and the computer team is larger, a probability of giving a player card with higher ability (or rarity) to the user may be increased.

In order to implement this aspect, correlation information on a correlation between a result of a match and probability information is necessary. The game data giving unit 150 changes the probability information for determining a player card to be given to the user based on the correlation information and the result of the match.

Third Modified Example

It is described in the above described embodiment that the strength level of the computer team is increased so that the strength of the computer team in the next match is increased, when a player card of the type "great", "star", or "superstar" is given to a user.

However, the probability of selecting a player card with high ability (or rarity) as a member of the computer team or the probability of giving a player card with high ability (or rarity) to a user may be decreased, instead of increasing the strength level of the computer team.

Fourth Modified Example

The opponent game data group determination unit 146 may determine a plurality of game data sets to be members of the opponent game data group based on the number of times information stored in the transfer number of times storage unit for storing number of times information on a number of times a right of requesting a match is transferred.

In this embodiment, to transfer the golden whistle corresponds to "to transfer a right of requesting a match". Further, as the golden whistle is transferred every use thereof in this embodiment, the number of times the golden whistle is used (the number of golden whistles remaining) corresponds to the above mentioned "number of times information".

In determination of eleven player cards to be members of the computer team based on the above described number of times information, correlation information on a correlation between the above mentioned number of times information and information on player card determination control is necessary.

FIG. 34 shows one example of the above mentioned correlation information. In the correlation information shown in FIG. 34, a correlation between the number of golden whistles remaining and probability information for determining members of the computer team is determined. The correlation information shown in FIG. 34 is referred to at step S305 in FIG. 31, for example. Specifically, at S305 in FIG. 31, the control unit 11 refers to the correlation information shown in FIG. 34, and obtains probability information correlated to the number of golden whistles remaining at the time of using the golden whistle. Then, the control unit 11 determines eleven player cards to be members of the computer team based on the probability information obtained.

Fifth Modified Example

The match execution unit 148 may execute processing such as will be described below, instead of executing the simple simulation processing. That is, a game space may be created in which eleven player characters corresponding to eleven player cards that are members of the user team and eleven player characters corresponding to eleven player cards that are members of the computer team are placed. Then, the play execution unit 148 may execute the match between the user team and the opponent team, in which the user team and the computer team are both operated by the computer. Alternatively, the match between the user team and the computer team may be executed, in which the user operates the user team and the computer operates the computer team.

Sixth Modified Example

The user data may include a "closeness" field indicating closeness between users, instead of the "friend list" field showing the friend list. In this case, the other user access status determination unit 158 may determine whether or not a status of access to the game system 1 (the game server 10) from another user having a closeness to the user equal to or larger than a reference value is of a predetermined status. Similarly, the match request right transfer unit 156 may execute transfer processing of transferring a right to another user having a closeness to the user who has the right equal to or larger than the reference value.

Seventh Modified Example

In the player selection screen 90, eleven player cards 92 that are members of the computer team may be shown, such that a user can know which player card is correlated to which player.

Eighth Modified Example

Although a case in which the present invention is applied to a game system for executing a match between a soccer team of a user and a soccer team of a computer is described in the above, the present invention can be applied to a game system for executing a game other than such a soccer game. For example, the present invention can be applied to a game system for executing a match between a baseball team of a user and a baseball team of a computer.

The present invention can be applied to a game system for executing a game other than a sport game. The present invention can be applied to a game system for executing a match based on a game character group or a game character of a user and a game character group of a computer. For example, the present invention can be applied to a game system for executing a game in which one or more game characters of a user fight against a plurality of game characters of a computer. Further, the present invention can be applied to a game system for executing a match based on a game item group or a game item of a user and a game item of a computer.

The invention claimed is:

1. A game control device that is capable of communication with a user terminal and that executes a match based on one of a game data group and game data of a user, and an opponent game data group, the game control device comprising:

match request receiving means for receiving a match request sent from the user terminal;

opponent game data group determination means for determining a plurality of game data sets as members of the opponent game data group;

match executing means for executing the match based on the opponent game data group and one of the game data group and the game data of the user in a case where the match request is received; and game data giving means for giving at least one of the plurality of game data sets that are members of the opponent game data group to the user in a case where the match is executed, wherein the one of the game data group and the game data of the user is one of a game character group and a game character of the user, the opponent game data group is an opponent game character group, and in a case where the user wins the match, the game data giving means gives at least one of the plurality of game characters that are members of the opponent game character group so that the at least one of the plurality of game characters can be used by the user as one of a member of the game character group and the game character of the user.

2. The game control device according to claim 1, wherein the match request receiving means comprises means for receiving a selection of at least one of a plurality of options relevant to the match request, the game control device comprises parameter update means for updating a parameter based on the option selected by the user, the parameter being stored in parameter storage means for storing the parameter so as to be correlated to the user, and the opponent game data group determination means comprises means for determining the plurality of game data sets to be the members of the opponent game data group based on the parameter.

3. The game control device according to claim 2, further comprising:

means for determining whether or not the parameter is at a predetermined value; and means for restricting execution of the match in a case where the parameter is at the predetermined value.

4. The game control device according to claim 1, further comprising:

strength information update means for updating strength information such that the strength of the opponent game data group is increased in at least one of a case in which the match is executed, a case in which the user wins the match, a case in which the game data is given to the user, and a case in which the game data given to the user is predetermined game data, the strength information being information on strength of the opponent game data group and being stored in strength information storage means for storing the strength information so as to be correlated to the user, wherein the opponent game data group determination means includes means for setting the opponent game data group based on the strength information.

5. The game control device according to claim 4, wherein the strength information update means updates the strength information such that the strength of the opponent game data group is increased in a case where a predetermined type of game data is given to the user, and the strength information update means determines an amount by which to increase the strength of the opponent game data group, based on a type of the game data given to the user.

6. The game control device according to claim 4, further comprising:

means for determining whether or not it has become a predetermined time or a predetermined time and date; and means for updating the strength information such that the strength of the opponent game data group is decreased in a case where it has become the predetermined time or the predetermined time and date.

7. The game control device according to claim 1, further comprising:

right giving means for giving a right of requesting the match to the user, wherein the match request receiving means receives the match request in a case where the user holds the right, the game control device includes right transfer means for executing transfer processing for transferring the right held by the user to another user, and the opponent game data group determination means includes means for determining the plurality of game data sets to be the members of the opponent game data group based on a number of times the right has been transferred, the number of times the right has been transferred being stored in a storage that stores the number of times the right has been transferred.

8. The game control device according to claim 7, wherein the right transfer means executes the transfer processing for transferring the right to another user having a predetermined relationship with the user holding the right based on relationship information, the relationship information being information on a relationship between users and being stored in relationship information storage means for storing the relationship information.

9. The game control device according to claim 1, further comprising:

access status determination means for determining whether or not a status of access from another user having a predetermined relationship with the user to the game control device is of a predetermined status based on relationship information, the relationship information being information on a relationship between users and being stored in relationship information storage means for storing the relationship information, wherein the opponent game data group determination means includes means for determining the plurality of game data sets to be the members of the opponent game data group based on a result of determination by the access status determination means.

10. The game control device according to claim 1, wherein
the opponent game data group determination means selects the plurality of game data sets to be the members of the opponent game data group from among a plurality of game data sets stored in game data storage means for storing the plurality of game data sets.

11. The game control device according to claim 1, wherein
one of each of a plurality of game characters that are members of the game character group of the user and the game character of the user is displayed on a display as a game card, and each of the plurality of game characters that are members of the opponent game character group is displayed on the display as a game card.

12. A control method for a game control device that is capable of communication with a user terminal and that executes a match based on one of game data group and game data of a user, and an opponent game data group, the control method comprising:
receiving a match request sent from the user terminal;
determining a plurality of game data sets as members of the opponent game data group;
executing the match based on the opponent game data group and one of the game data group and the game data of the user in a case where the match request is received; and
giving at least one of the plurality of game data sets that are members of the opponent game data group to the user in a case where the match is executed,
wherein the one of the game data group and the game data of the user is one of a game character group and a game character of the user,
the opponent game data group is an opponent game character group, and
the giving comprises giving at least one of the plurality of game characters that are members of the opponent game character group so that the at least one of the plurality of game characters can be used by the user as one of a member of the same character group and the same character of the user, in a case where the user wins the match.

13. A non-transitory computer readable information storage medium for storing a program for causing a computer to function as a game control device that is capable of communication with a user terminal and that executes a match based on one of a game data group and game data of a user; and an opponent game data group, the program for causing the computer to:
receive a match request sent from the user terminal;
determine a plurality of game data sets as members of the opponent game data group;
execute the match based on the opponent game data group and one of the game data group and the game data of the user in a case where the match request is received; and
give at least one of the plurality of game data sets that are members of the opponent game data group to the user in a case where the match is executed,
wherein the one of the game data group and the game data of the user is one of a game character group and a game character of the user,
the opponent game data group is an opponent game character group, and
the program causes the computer to give at least one of the plurality of game characters that are members of the opponent game character group so that the at least one of the plurality of game characters can be used by the user as one of a member of the game character group and the tame character of the user, in a case where the user wins the match.

14. A game control device that is capable of communication with a user terminal and that executes a match based on one of a game data group and game data of a user, and an opponent game data group, the game control device comprising:
a match request receiving unit that receives a match request sent from the user terminal;
an opponent game data group determination unit that determines a plurality of game data sets as members of the opponent game data group;
a match executing unit that executes the match based on the opponent game data group and one of the game data group and the game data of the user in a case where the match request is received; and
a game data giving unit that gives at least one of the plurality of game data sets that are members of the opponent game data group to the user in a case where the match is executed,
wherein the one of the game data group and the game data of the user is one of a game character group and a game character of the user,
the opponent game data group is an opponent game character group, and
in a case where the user wins the match, the game data giving unit give at least one of the plurality of game characters that are members of the opponent game character group so that the at least one of the plurality of game characters can be used by the user as one of a member of the game character group and the game character of the user.

15. A game control device that is capable of communication with a user terminal and that executes a match based on one of a game data group and game data of a user, and an opponent game data group, the game control device comprising a first microprocessor configured to
receive a match request sent front the user terminal;
determine a plurality of game data sets as members of the opponent game data group;
execute the match based on the opponent game data group and one of the game data group and the game data of the user in a case where the match request is received; and
give least one of the plurality of game data sets that are members of the opponent game data group to the user in a case where the match is executed,
wherein the one of the game data group and the game data of the user is one of a game character group and a game character of the user,
the opponent game data group is an opponent game character group, and
the first microprocessor is configured to give at least one of the plurality of game characters that are members of the opponent game character group so that the at least one of the plurality of game characters can be used by the user as one of a member of the game character group and the game character of the user, in a case where the user wins the match.

16. The game control device according to claim 1, wherein
the game data giving means comprises:
means for determining number of game data sets to be given to the user based on a result of the match in a case where at least one of the plurality of game data sets that are members of the opponent game data group is to be given to the user.

17. The game control device according to claim 16, wherein,
in a case where the user wins the match, more game data sets are given to the user than if the user does not win the match.

18. The game control device according to claim 16, wherein
in a case where a score of the one of a game data group and game data of the user is larger than a score of the opponent game data group when the match ends, it is determined that the user wins the match, and
in a case where the user wins the match, the larger a difference in score, the larger a number of game data sets given to the user.

* * * * *